United States Patent
Lörcher et al.

(10) Patent No.: US 10,550,854 B2
(45) Date of Patent: Feb. 4, 2020

(54) IMPELLER WHEEL FOR DIAGONAL OR RADIAL FANS, INJECTION MOLDING TOOL FOR MANUFACTURING SUCH AN IMPELLER WHEEL, AND DEVICE COMPRISING SUCH AN IMPELLER WHEEL

(71) Applicant: ZIEHL-ABEGG SE, Künzelsau (DE)

(72) Inventors: Frieder Lörcher, Braunsbach (DE); Andreas Gross, Neuenstein (DE); Sandra Hub, Pfedelbach (DE); Lothar Ernemann, Heilbronn (DE); Georg Hofmann, Tauberbischofsheim (DE)

(73) Assignee: Ziehl-Abegg SE, Künzelsau (DE)

( * ) Notice: Subject to any disclaimer, the term of this patent is extended or adjusted under 35 U.S.C. 154(b) by 441 days.

(21) Appl. No.: 14/703,906

(22) Filed: May 5, 2015

(65) Prior Publication Data

US 2015/0316073 A1 Nov. 5, 2015

(30) Foreign Application Priority Data

May 5, 2014 (DE) .................. 10 2014 006 756

(51) Int. Cl.
*F04D 29/66* (2006.01)
*B29C 45/26* (2006.01)
(Continued)

(52) U.S. Cl.
CPC .............. *F04D 29/66* (2013.01); *B29C 45/26* (2013.01); *F04D 17/00* (2013.01); *F04D 19/002* (2013.01); *F04D 29/263* (2013.01); *F04D 29/281* (2013.01); *F04D 29/30* (2013.01); *F04D 29/325* (2013.01); *F04D 29/62* (2013.01);
(Continued)

(58) Field of Classification Search
CPC ...... F04D 29/281; F04D 29/282; F04D 29/30; F04D 29/263; F04D 29/266; F04D 29/626; F04D 29/661; F04D 29/666; B29C 45/26
USPC ... 416/185, 186 R, 187, 188, 223 B, DIG. 2, 416/DIG. 5, 183; 417/360, 423.6
See application file for complete search history.

(56) References Cited

U.S. PATENT DOCUMENTS

2008/0292464 A1  11/2008  Keber et al.
2010/0098544 A1   4/2010  Keber et al.
(Continued)

FOREIGN PATENT DOCUMENTS

CN   2090920   12/1991
CN   2486306    4/2002
(Continued)

*Primary Examiner* — Christopher Verdier
(74) *Attorney, Agent, or Firm* — Gudrun E. Huckett

(57) ABSTRACT

An impeller wheel for fans has a bottom disc, a cover disc, and three-dimensionally shaped blades connected to the bottom disc and the cover disc. The bottom disc, cover disc, and the blades form a one-piece part. The blades have a leading edge and a trailing edge, wherein the leading edge and the trailing edge each have a median diameter. In a projection onto a cylinder that is coaxial with a rotation axis of the impeller wheel and has a diameter matching a median diameter of the trailing edge or of the leading edge, a first extension of the trailing edge and/or the leading edge is positioned at a first angle and a second extension of the trailing edge and/or the leading edge is positioned at a second angle relative to a line parallel to the rotation axis. At least one of the first and second angles is different from 0°.

33 Claims, 17 Drawing Sheets

(51) Int. Cl.
  *F04D 17/00* (2006.01)
  *F04D 19/00* (2006.01)
  *F04D 29/32* (2006.01)
  *F04D 29/62* (2006.01)
  *F04D 29/64* (2006.01)
  *F04D 29/28* (2006.01)
  *F04D 29/30* (2006.01)
  *F04D 29/26* (2006.01)

(52) U.S. Cl.
  CPC ........... *F04D 29/626* (2013.01); *F04D 29/64* (2013.01); *F04D 29/666* (2013.01); *F05D 2250/70* (2013.01)

(56) References Cited

U.S. PATENT DOCUMENTS

| | | | |
|---|---|---|---|
| 2010/0202886 | A1 | 8/2010 | Iwata et al. |
| 2010/0329871 | A1* | 12/2010 | Cahill ................... F04D 29/023 416/187 |
| 2011/0064583 | A1 | 3/2011 | Billotey et al. |
| 2012/0045338 | A1* | 2/2012 | Tadokoro ................ F04D 29/30 416/196 R |
| 2012/0315135 | A1 | 12/2012 | Sato et al. |
| 2014/0154114 | A1* | 6/2014 | Seok ..................... F04D 25/026 417/410.1 |

FOREIGN PATENT DOCUMENTS

| | | | |
|---|---|---|---|
| CN | 201674885 | | 12/2010 |
| GB | 2 458 617 A | | 9/2009 |
| GB | 2486019 A | * | 6/2012 ............. F04D 17/06 |
| JP | 53-61625 | | 5/1978 |
| JP | H09-250492 | | 9/1997 |
| JP | 2001-317488 | | 11/2001 |
| JP | 2007107435 A | | 4/2007 |
| JP | 2011-038445 | | 2/2011 |
| JP | 2011-521145 | | 7/2011 |
| JP | 2011-256860 | | 12/2011 |
| WO | 2013/160043 | | 10/2013 |

* cited by examiner

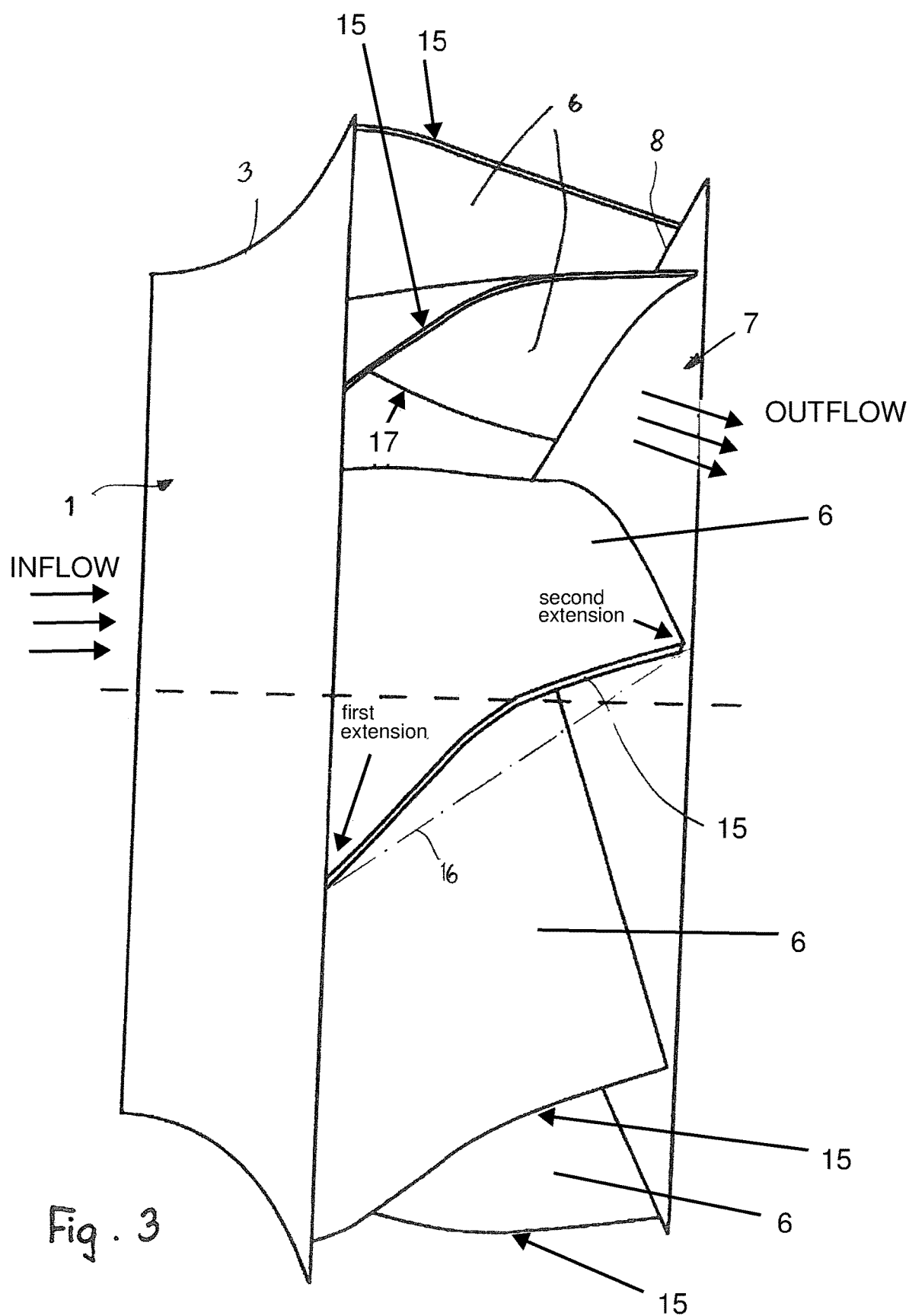

IMPELLER WHEEL FOR DIAGONAL OR RADIAL FANS, INJECTION MOLDING TOOL FOR MANUFACTURING SUCH AN IMPELLER WHEEL, AND DEVICE COMPRISING SUCH AN IMPELLER WHEEL

BACKGROUND OF THE INVENTION

The invention relates to a impeller wheel for diagonal or radial fans, comprising a bottom disc and a cover disc that are interconnected by three-dimensionally shaped blades that are made in a single part with the bottom disc and the cover disc. The invention further relates to an injection molding tool for manufacturing such an impeller wheel into which a plastic material is injected to manufacture the impeller wheel. The invention also concerns a device comprising at least one such impeller wheel.

Impeller wheels for diagonal or radial fans are known that have a 2D-geometry and that are manufactured in one piece as injection molded parts. However, impeller wheels with a 2D-geometry have relatively low efficiency factors, low airflow performance and high noise levels.

Moreover, 3D-impeller wheels are known which are, however, manufactured in several parts that have to be connected to each other. Such impeller wheels can thus not be manufactured economically.

It is thus the object of the invention to design the generic impeller wheel, the generic injection molding tool and the device in such a manner that simple manufacture of impeller wheels with a three-dimensional geometry and thus particularly high efficiency factors, particularly high airflow performance and particularly low acoustics is possible with the use of only small quantities of material.

SUMMARY OF THE INVENTION

In regard to the impeller wheel of the aforementioned kind, this object is solved according to the invention in that, in a projection onto a cylinder which is coaxial with the rotation axis and which has a median diameter of the trailing edge or of the leading edge, the extensions of the trailing edge and/or of the leading edge of the blades are positioned respectively at an angle ($\beta 1$, $\beta 2$) relative to a line that is parallel to the rotation axis, wherein the at least one of the angles ($\beta 1$, $\beta 2$) is different from 0°.

In regard to the injection molding tool of the aforementioned kind, this object is solved according to the invention in that for manufacturing the bottom disc with the interface at least one mold insert is provided that is situated between two sliders of the injection molding tool.

In regard to the device of the aforementioned kind, this object is solved according to the invention in that the device comprises an impeller wheel according to the invention.

The impeller wheel according to the invention is characterised in that its bottom disc, its cover disc, and its blades are three-dimensionally formed in such a manner that they can be manufactured in an injection molding process so as to be formed in one piece (monolithic). When projected onto a coaxial cylinder with a median diameter of the trailing edge or of the leading edge, the extensions of the trailing edge and/or of the leading edge of the blade are positioned, respectively, at an angle relative to a line that is parallel to the rotation axis, wherein at least one of the angles is different from 0°. The three-dimensional impeller wheel geometry results in a high efficiency factor and low noise level. The impeller wheel is designed in such a manner that demoldability from the injection molding tool is ensured.

The three-dimensional design makes it possible, apart from achieving a high efficiency factor, a high airflow performance and low noise emission, to design these components with thin walls, while nevertheless achieving a high-strength impeller wheel. Advantageously, at least one of the angles is greater than 0°.

According to the invention, in a particularly advantageous embodiment, the impeller wheel is designed in such a manner that the two angles between the projections of the extensions of the trailing edge and/or of the leading edge of the blades and the parallel line to the rotary axis clearly differ from each other, which can result in a curved progression of the trailing edge and/or of the leading edge.

Preferably, the angle associated with the cover disc is greater than the angle associated with the bottom disc.

Advantageously, the cover disc is designed in such a manner that its diameter, when viewed in the axial section, increases from the air inlet in the direction of the air outlet. Such a design facilitates demoldability from the injection molding tool. Moreover, such a design of the cover disc contributes to the high efficiency factor and to the low noise level.

The generatrix of the cover disc is preferably designed to be curved in such a manner that the diameter of the cover disc steadily increases from the air inlet to the air outlet. By means of the generatrix, the three-dimensional shape of the cover disc can be determined very easily.

The fact that the generatrix extends in a straight line at a distance from the air inlet further advantageously contributes to easy deformability of the impeller wheel from the injection molding tool.

In a further advantageous embodiment the diameter of the bottom disc, when viewed in the axial section, increases from the side facing the cover disc. A bottom disc designed in this manner advantageously contributes to the high bottom disc efficiency factor and to the low noise level.

The generatrix of the bottom disc extends from the side facing the cover disc so as to be curved in such a manner that the diameter of the bottom disc increases in the axial section. By means of the generatrix the three-dimensional shape of the bottom disc can in a simple manner be matched to the required operating conditions of the impeller wheel.

The fact that the generatrix extends in a straight line at a distance from its end facing the cover disc further advantageously contributes to easy deformability.

In a particularly advantageous embodiment, in which high airflow performance, a high efficiency factor, and low noise emission are achieved, the angle $\alpha 2$, at which the bottom disc at its free edge facing away from the cover disc is positioned in the axial section relative to a radial line, is smaller by at least 3° than the angle $\alpha 1$, at which the cover disc at its end facing the air outlet is positioned in the axial section relative to a radial line.

To ensure high strength despite a thin-walled design of the blades, the transitional region of the blades to the cover disc and/or to the bottom disc is rounded. Therefore the critical transitional region can be designed in such a manner that when the impeller wheel is in operation, stress peaks can be avoided, and the loads can be safely absorbed in this region.

In order to make it possible for the transitional region to cope with the loads expected during operation, it is advantageous if the transition of the blades to the cover disc and/or to the bottom disc extends to a different width on each side of the blades.

Thus, for example, the rounded shape in the direction of the blades differs in width from the rounded shape in the direction of the cover disc/bottom disc.

To ensure easy connectability of the impeller wheel to the motor, the bottom disc comprises a corresponding interface for connection to a motor.

If the dimensions of the motor are small, the interface advantageously is a ring-shaped disc provided on the inner edge of the bottom disc.

To ensure easy connection of the impeller wheel to the motor, the interface is situated within the region encompassed by the blades of the impeller wheel, when viewed in the axial direction of the impeller wheel.

If the impeller wheel is intended for a motor with larger dimensions, the interface is advantageously provided at a distance from the inner edge of the bottom disc and is formed by support sleeves that protrude from the outer side of the bottom disc. In order to connect the motor to the impeller wheel, fastening screws can be screwed directly into the support sleeves, or into metal sleeves inserted into the support sleeves.

In a preferred embodiment the connection of the impeller wheel to the motor is established with the use of self-tapping plastic screws that are screwed into the support sleeves.

In order to improve the dynamic flow in the region of the interface, in an advantageous embodiment a flow cap can be placed onto the inner edge of the bottom disc.

Said flow cap is advantageously designed in such a manner that its exterior side at least approximately forms a steady continuation of the inner side of the bottom disc.

For manufacturing the cover disc together with the interface, the injection molding tool according to the invention comprises at least one mold insert situated between two sliders. By means of the mold insert, within the two molding parts, the bottom disc with the interface is manufactured within the injection molding tool. The shape of the mold insert depends on the intended shape of the interface. Thus with a simple change of the mold insert it is possible to easily manufacture, in the injection molding tool, bottom discs with different interfaces.

Since by means of the mold insert the entire bottom disc with the interface is formed, the tool costs are not yet optimal. For this reason, an advantageous embodiment provides that the mold insert is an adapter insert into which smaller auxiliary mold inserts for forming the interface can be inserted. The adapter insert is essentially used for forming the bottom disc, while the inserted small auxiliary mold inserts are used to form the interface on the bottom disc. With the use of the adapter insert with the small auxiliary mold inserts, tool costs are saved, because forming the various interfaces only requires the small auxiliary mold inserts.

The device according to the invention comprises at least one fan with an impeller wheel according to the invention.

Advantageously, the device comprises at least two fans, arranged side by side. Consequently, the device can be cooled in an outstanding manner.

If the axial distance between the fans is at most approximately 1.75*D1, wherein D1 denotes the diameter of the cover disc in the region of the air outlet, the device can feature a compact design despite comprising at least two fans.

A device that is particularly compact in terms of the airflow performance can be designed in such a manner that the device sidewalls in the radial direction reach very closely to the air outlet of the impeller wheel of the fan, without incurring significant losses relating to the efficiency factor, the airflow performance or the low noise level. A particularly compact device has characteristic dimensions of the device sidewalls Dg (diameter in the case of a round shape; sidewall distances in the case of a rectangular shape) of Dg<=1.75 D1, wherein D1 denotes the diameter of the cover disc in the region of the air outlet.

The subject of the application not only results from the subject of the individual claims, but also from all the details and characteristics disclosed in the drawings and in the description. To the extent that, individually or in combination, they are novel over the state of the art they are claimed to be significant in the context of the invention, even if they are not the subject of the claims.

Further characteristics of the invention are stated in the further claims, in the description and in the drawings.

BRIEF DESCRIPTION OF THE DRAWINGS

Below, the invention is explained in more detail with reference to the exemplary embodiments shown in the drawings. The following are shown:

FIG. 3 a lateral view of the impeller wheel according to the invention,

DESCRIPTION OF PREFERRED EMBODIMENTS

Figure 1:
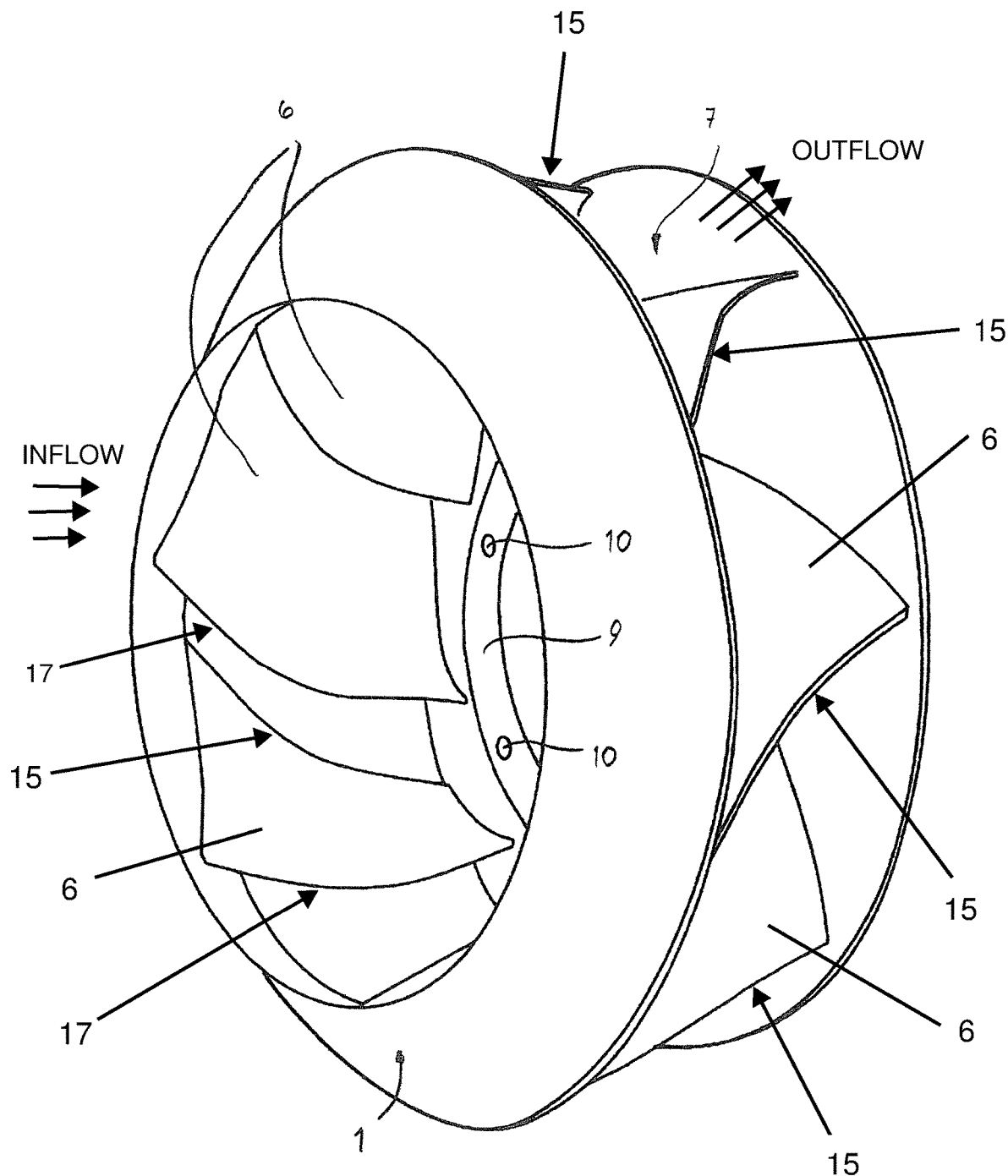
FIG. 1 a impeller wheel according to the invention.

The impeller wheel is provided for a fan, which can be a diagonal fan or a radial fan. The impeller wheel is characterised by a free, three-dimensional, geometric design. In other words, there are no straight lines or planar or extruded surfaces on the fan blades. In this context the term "extruding" refers to the formation of the surface of the fan blades by the parallel spatial shift of a generatrix. Fans featuring such impeller wheels have a very high efficiency factor and a particularly low noise level. The impeller wheel has been manufactured in one piece (monolithic) as an injection molded part. The fan blades, the bottom disc and the cover disc of the impeller wheel feature a thin-walled design so that material can be saved in the manufacture of the impeller wheel. Nonetheless, the impeller wheel distinguishes itself by its high strength.

Advantageously, the impeller wheel is made from a fibre-reinforced thermoplastic material. In possible embodiments the thermoplastic material can be polyamide (PA6, PA66, PA66/6, PAPA, PPA, PA 4.6, PA12), polyester (PBT, PET), polypropylene (PP), PPS, PES, PESU, PEEK, ABS, PC or ASA, preferably a polyamide or polypropylene. The reinforcement fibres can be made from glass, carbon, aramid, a thermoplastic material (PET, PA) or a natural fibre (for example: flax, hemp, sisal, jute, coconut), preferably from glass fibre.

The impeller wheel has a cover disc 1, by way of which air is aspirated in the direction of the airflow arrows 2. The cover disc 1 is designed as a rotational body and comprises a flow cross section that steadily expands in the inflow direction. Advantageously, the cover disc 1 is designed in such a manner that in the region of the air outlet 4 (FIG. 2) its diameter is larger by approximately 30 to 70% than in the region of the inlet 5.

The cover disc 1 is connected to the bottom disc 7 by means of blades 6. As is the case with the bottom disc 7, in the exemplary embodiment the cover disc 1 is designed as a rotational body. The bottom disc 7 is essentially conical in design and comprises a jacket 8, which together with the opposite wall arrangement of the cover disc 1 forms a passage for the airflow. The diameter of the bottom disc 7 is largest at its free end, with the diameter, for example, being greater than the diameter of the inlet 5 of the cover disc 1. Advantageously, from the free end of the jacket 8 the diameter of the bottom disc 7 steadily decreases in the direction of the cover disc 1. A motor connection 9 adjoins the inner end of the jacket 8, which motor connection 9, designed as an annular disc, forms an interface for connecting the drive motor. The motor connection 9 is situated in a radial plane of the impeller wheel. The motor connection comprises through-apertures 10, distributed on the circumference, for holding fastening screws.

In the axial section, the jacket 8 of the bottom disc 7 can extend in a straight line along its length. In the exemplary embodiment shown, the jacket 8 extends in a curved manner following on from the motor connection 9, and extends in a straight line only at a distance from said motor connection 9.

The cover disc 1 and the bottom disc 7 are preferably designed as rotational bodies. However, they can also have any other shape or form, depending on the particular application and design of the fan to which the impeller wheel is to be mounted.

Figure 2:
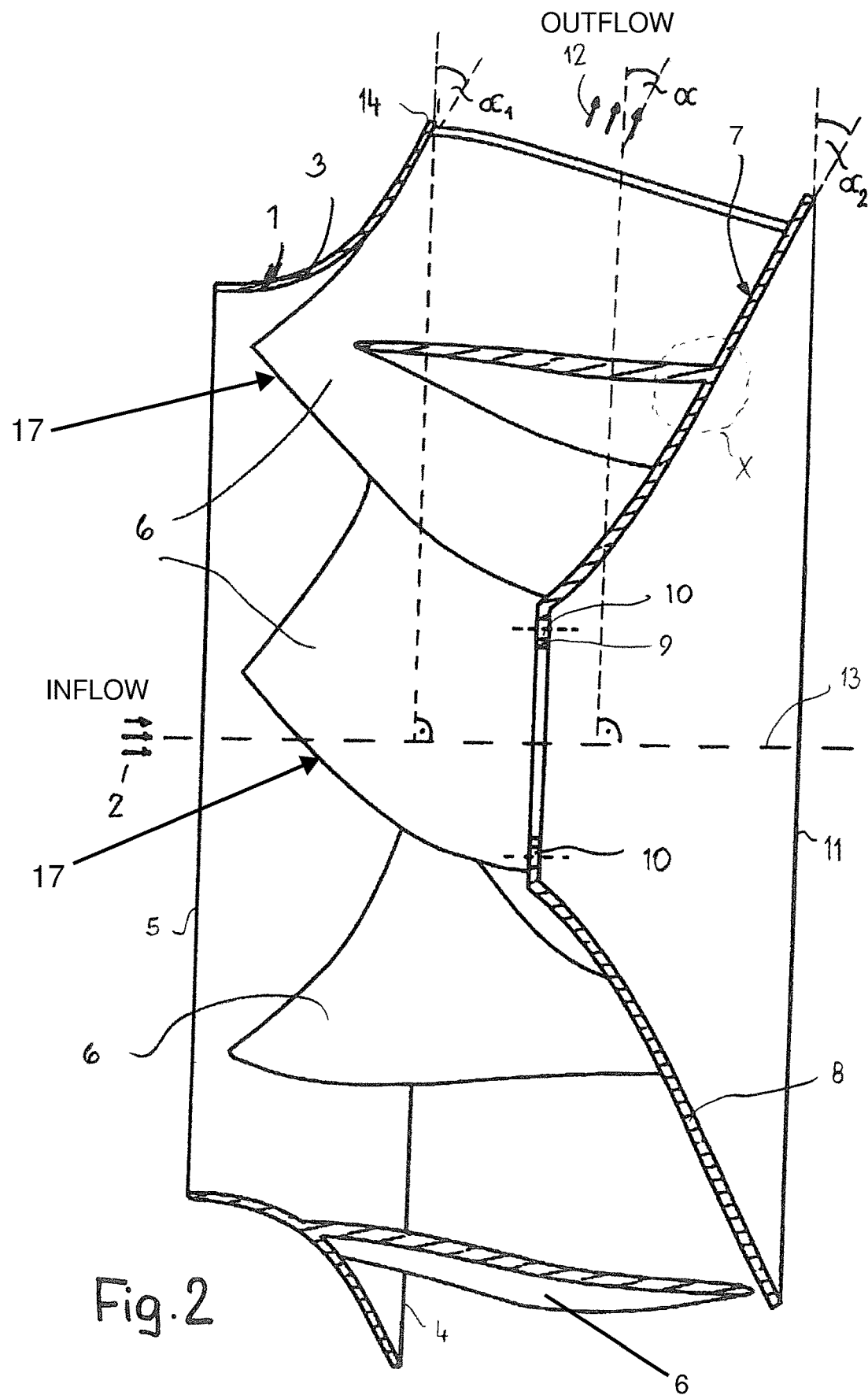
FIG. 2 an axial section of the impeller wheel according to FIG. 1.

The cover disc 1 and the bottom disc 7 are interconnected by means of the blades 6. As shown in FIGS. 1 to 3, the blades 6 are arranged at a short distance from the inlet 5 of the cover disc 1, and at a short distance from the free edge 11 of the bottom disc 7. The blades 6 have the same design; when the fan is in operation they ensure that the air is aspirated, in the direction of the airflow arrows 2, by way of the inlet aperture 5 of the cover disc 1, and flows obliquely outwards in the direction of the airflow arrows 12 between the wall arrangement 3 of the cover disc 1 and the jacket 8 of the bottom disc 7. In the axial section according to FIG. 2 the flow direction 12, which is projected onto the drawing plane that corresponds to an axial plane, is arranged at an acute angle $\alpha$ to the associated radial line of the impeller wheel.

The angle $\alpha$ describes the angle between the imaginary middle flow direction 12, projected onto the axial plane, at the impeller wheel outlet, which flow direction 12 is estimated from geometric characteristics of the impeller wheel, and the perpendicular contained in the axial plane, onto the rotation axis 13 of the impeller wheel. In the case of diagonal fans the angle $\alpha$ is between approximately 20° and approximately 70°. In this process, the angle $\alpha$ is defined according to the relationship $\alpha=0.5*(\alpha 1+\alpha 2)$. The angle $\alpha 1 \geq \alpha 2$ is maintained if a high efficiency factor and a low noise level are required. In a particularly advantageous embodiment, in which high airflow performance, a high efficiency factor and low noise emission are achieved, $\alpha 2$ is smaller by at least 3° than $\alpha 1$. An advantageous angular range is between approximately 5° and 15°.

The angle $\alpha 1$ is determined between the perpendicular, contained in the axial plane, on the rotation axis 13 and the extension, contained in the axial plane, of the wall arrangement 3 of the cover disc 1. In this process the perpendicular on the rotation axis 13 extends through the free end 14 of the cover disc 1.

Determining the angle $\alpha 2$ between the perpendicular, contained in the axial plane, on the rotation axis 13 and the extension, contained in the axial plane, of the jacket 8 of the bottom disc 7 takes place in the same manner. In this process the perpendicular extends through the free edge 11 of the bottom disc 7.

With reference to FIG. 3 the three-dimensional design of the blades 6 is explained. The blades 6 have trailing edges 15 whose curve of progression significantly differs from the associated straight chord 16. Said chord 16 connects the two ends of the trailing edge 15. The leading edge 17 of the blades 6, too, has a curve of progression that significantly differs from the associated straight chord. In an advantageous embodiment the maximum distance of the chord 16 from the blade trailing edge is greater than 8% of the length of the chord 16. Analogously, this also applies to the blade leading edge and its chord. The blades 6 are designed in such a manner that in spite of its complex three-dimensional geometry the entire impeller wheel can be manufactured simply and economically in an injection molding tool.

Figure 3A:
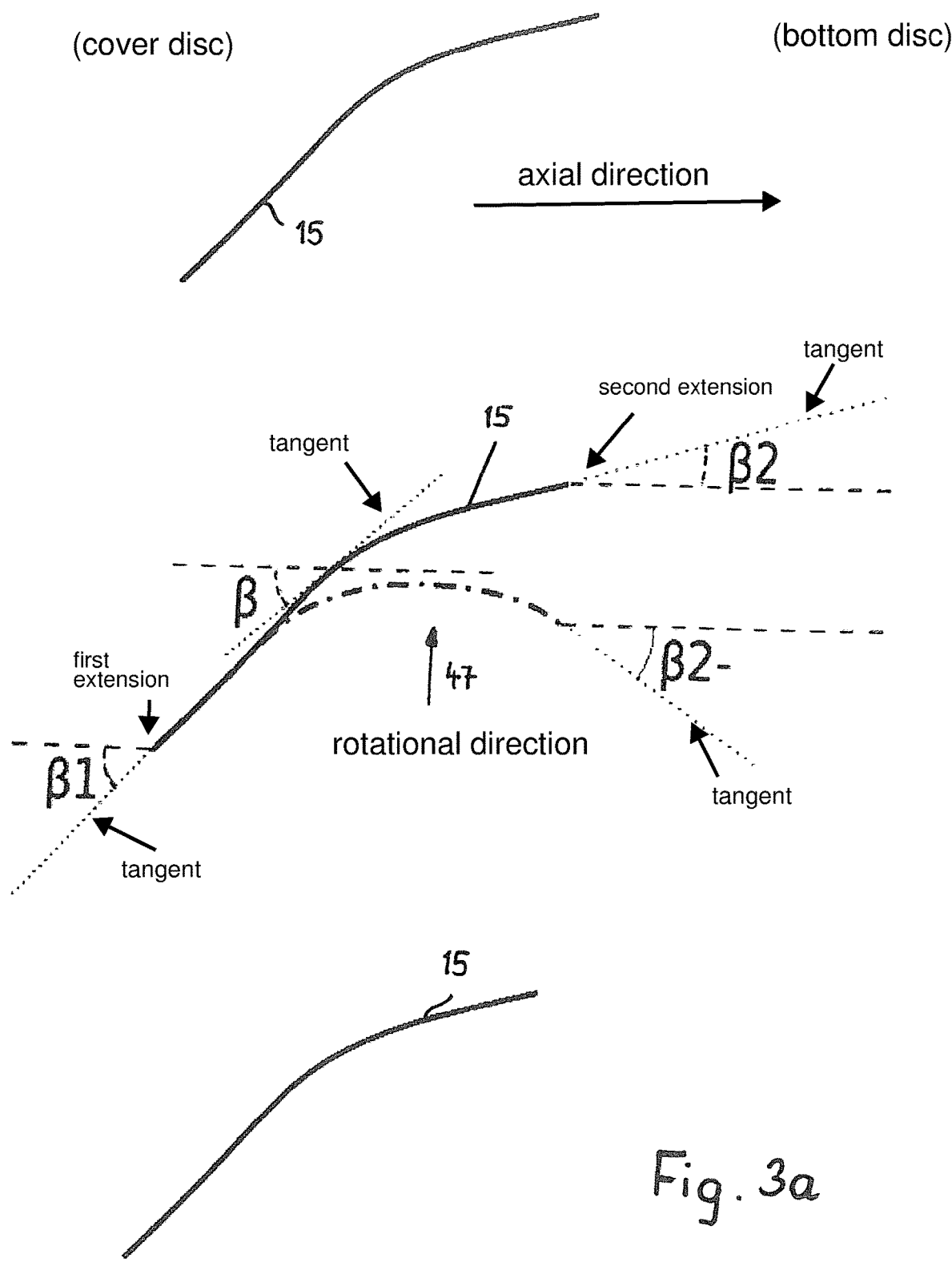
FIG. 3a a two-dimensional view of the trailing edges of the blades with characteristic angles, FIGS. 4a to 4c an enlarged view of various design options of detail X in FIG. 2, FIG. 5 a front view of the impeller wheel according to the invention, FIG. 6 an axial section of the impeller wheel, which comprises a motor connection for large motors, FIG. 6a in a view according to FIG. 2 characteristic angles to determine the profile section of the blades of the impeller wheel, FIG. 6b in a view according to FIG. 2 the impeller wheel with motor, FIG. 7 in a diagrammatic view a section of an injection molding tool, by means of which a impeller wheel with a motor connection for small motors is manufactured, FIG. 8 in a view corresponding to FIG. 7 the injection molding tool for manufacturing a impeller wheel with a motor connection for large motors, FIGS. 9 and 10 in views corresponding to FIG. 7 further embodiments of injection molding tools for manufacturing the impeller wheel, FIG. 11 in a diagrammatic section view a flow cap of the impeller wheel, FIG. 12 in an enlarged view a section along the line A-A in FIG. 6a, FIG. 13 a device according to the invention with two fans, arranged side by side, FIG. 14 a further embodiment of a device according to the invention.

Below is a description as to how the two-dimensional representation of the trailing edges 15 in FIG. 3a is arrived at. In FIG. 3a the trailing edges 15, which in FIG. 3 are shown by narrow surfaces, are shown in a simplified manner by the progression of their centre line. In order to derive FIG. 3a from FIG. 3, the trailing edges, which are represented in a simplified manner as a line, are projected onto a cylinder surface area. In this process, the cylinder used for the projection has the rotation axis as the axis, and the median diameter of the two end points of the trailing edge 15 as the diameter. The projection method used is that of the shortest distance (the projected point is the point on the cylinder surface area, which point has the shortest distance from the original point). The image of the trailing edge 15, which image is projected onto the cylinder surface, is then unrolled into the drawing plane, and in this manner, finally, the representation of the trailing edges 15 in FIG. 3a is obtained. In an entirely analogous manner it is possible to derive a two-dimensional representation of the progression of the blade leading edge 17.

The angles $\beta$, $\beta 1$ and $\beta 2$ in FIG. 3a have positive values. Positive angles tend to have the effect wherein the progression of the trailing edge moves in the direction of rotation 47 of the impeller wheel if one moves on the trailing edge in the direction of the bottom disc.

Depending on the aerodynamic characteristics required from the impeller wheel, negative angles β, β1 and β2 are also imaginable. FIG. 3a, as an example, diagrammatically shows a negative angle β2−. The negative angle β2− is determined in the same manner as has previously been explained in relation to positive values of the angle β2.

In order to approximately determine the three-dimensional nature of the blades 6 and thus of the impeller wheel, the angles β, β1 and β2 (FIG. 3a) are used which together are significantly greater than 0°. In FIG. 3a these angles are the angles between the respective tangents (shown in dotted lines) on the trailing edge 15 of the blade and on the axially parallel line (shown in dashed lines). For example, together the two angles β1 and β2 on the end points of the trailing edge 15 of the blade can be greater than approximately 10°. It is advantageous if the angles β1 and β2 have positive values. The two angles β1 and β2 (FIG. 3a) can be of the same size, or they can significantly differ from each other. In a particularly advantageous embodiment the two angles β1 and β2 differ by more than 10°. In this design β1 is greater than β2. The progression of the angle β from the starting point of the trailing edge 15 on the cover disc 1, where it has the value β1, and the end point of the trailing edge 15 on the bottom disc 7, where it has the value β2, is monotonically decreasing. However, a non-monotonic progression of the angle β is also imaginable.

The progressions, described in relation to the trailing edge of the blade, of the angles β, β1 and β2 can analogously also be applied to the progression of the leading edge of the blade. The progression of the trailing edges of the blades or of the leading edges of the blades or both progressions can comprise the described characteristics in order to describe in this manner a three-dimensional impeller wheel geometry. In an advantageous embodiment the trailing edge 15 and the leading edge 17 of the blade 6 progress on the side of the tangent, i.e. they do not have a kink.

Large angles β, β1 and β2 result in aerodynamic and aeroacoustic advantages. For reasons connected to manufacturing (demoldability from the injection molding tool in the case of one piece manufacture) it is advantageous to select angles that are not too large. Advantageously, β1 and β2 are no larger than 50°, and the largest angle β is no larger than 65° when viewed over the entire trailing edge 15.

Figure 12:
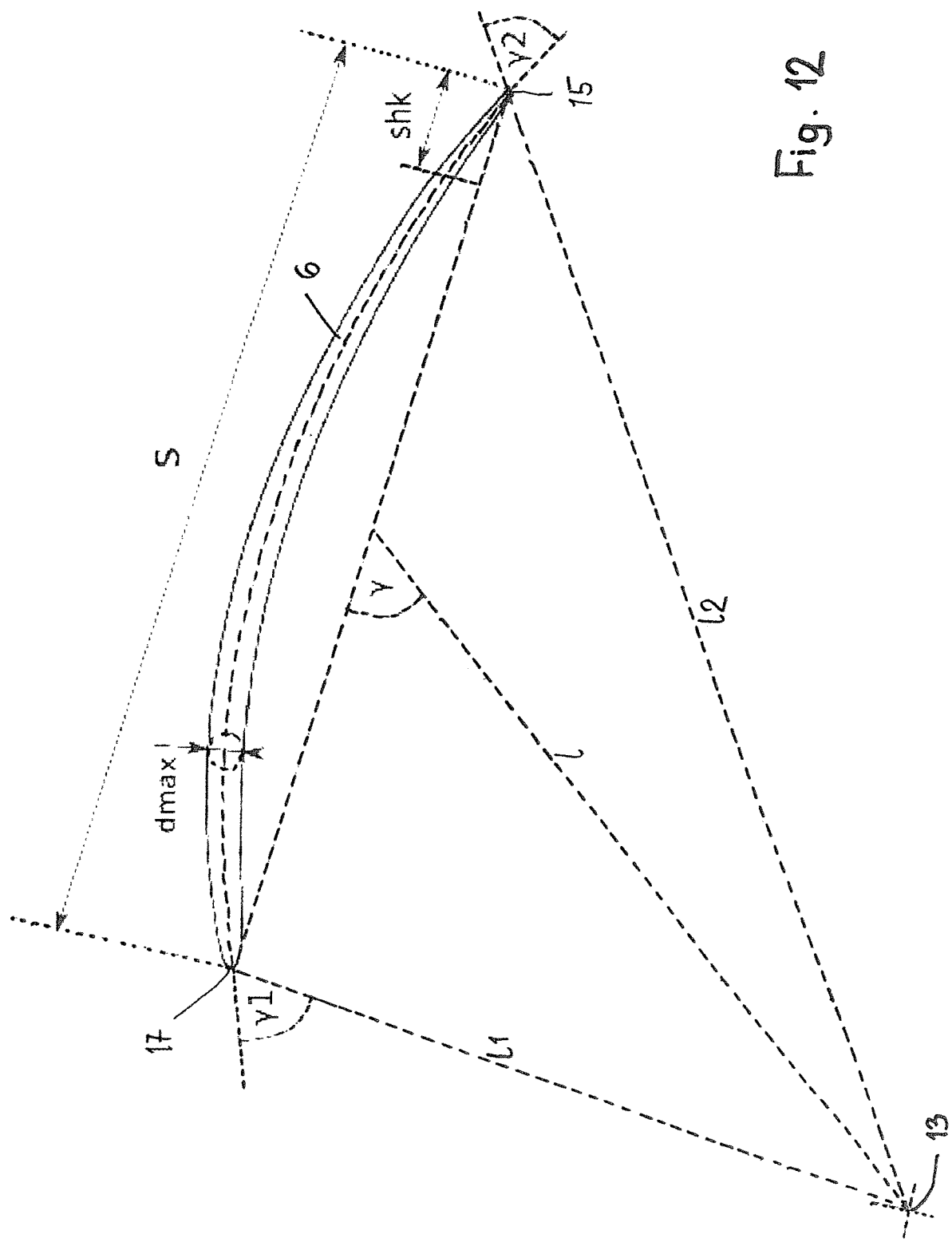

FIG. 12 shows a cross section of a blade 6. Such a cross section arises as a result of the intersection of a blade 6 with a sectional plane A-A, as shown in FIG. 6a. The position of the sectional planes A-A is now described in more detail.

Each possible sectional plane A-A intersects the centre line of the blade trailing edge 15 in a point P (FIG. 6a). In this point P the sectional plane A-A extends parallel to the imaginary flow outlet direction 12 projected onto the local axial plane, which flow outlet direction 12 has been described by the angle α. In addition, in the point P the sectional plane A-A extends parallel to the direction of the rotational speed (circumferential direction). Only those sectional planes are considered that intersect both the trailing edge of the blade and the leading edge of the blade. As a result of these conditions a sectional plane arises that is the sectional plane closest to the cover disc 1, and a sectional plane that is the sectional plane closest to the bottom disc 7. These two extreme sectional planes represent the beginning (cover disc) and the end (bottom disc) of the progression of the sectional planes.

A cross section of a blade 6 (FIG. 12), which cross section has been obtained in the described manner, preferably resembles a wing profile as known from aircraft. This results in low sound emission in operation and in high efficiency factors. In order to save materials and costs, preferably thin profile cross sections are selected. The ratio of maximum profile thickness dmax (largest described circle diameter) to profile chord length s is preferably d/s<0.04. In order to further minimise noise emission the thickness of the blade 6 in the region of the trailing edge 15 (on the downstream side) is further minimised. In order to be able to implement the thinnest possible trailing edge thickness in the manufacturing process, the thickness in the region shk (the last 10% of the chord length s) is massively reduced. The reduction factor of the thickness from the beginning to the end of this region directly on the trailing edge 15 is greater than 30%, preferably 50%.

The angle γ in the sectional plane (FIG. 12) designates the angle of the chord s to the line l that connects the chord centre to the rotary axis 13. Advantageously, this angle γ is between 20° and 70°. In a particularly advantageous embodiment this angle γ vanes between the different sections (from the cover disc to the bottom disc) by considerably more than 10°. The blade 6 is thus twisted, which is particularly advantageous in terms of the efficiency factor and the acoustics.

The twisting of the blades 6 can also be described with reference to the angles γ1 and/or γ2. In particularly advantageous embodiments the angles γ1 and/or γ2 between the various sections (from the cover disc to the bottom disc) vary by considerably more than 10°.

According to FIG. 12, γ1 denotes the angle between the tangent to the mean line of the blade profile on the blade leading edge 17 to the line l1 that connects the leading edge 17 to the rotary axis 13. Analogously, according to FIG. 12, γ2 denotes the angle between the tangent to the mean line of the blade profile on the blade trailing edge 15 to the line l2 that connects the trailing edge 15 to the rotary axis 13.

The three-dimensional nature of a blade also becomes clear by the strong variation in the chord length s between the different sections (from the cover disc to the bottom disc). In a particularly advantageous embodiment the chord length between the two outermost sections (on the cover disc and on the bottom disc) varies by more than 5%.

In a further particularly advantageous embodiment the section with the longest chord length is in a middle region of the impeller wheel between the cover disc and the bottom disc. In this case the maximum chord length is greater by at least 3% than the chord length in the section associated with the cover disc, and greater by at least 3% than the chord length in the section associated with the bottom disc.

The blades 6 have been made in one piece with the cover disc 1 and the bottom disc 7 (FIG. 2). The transitions between the blades 6 and the bottom disk or the cover disc can be of various designs, as will be described in more detail with reference to FIGS. 4a to 4c. In particular, these transitions can be designed in such a manner that, with the use of little in the way of material, stress peaks in this transitional region can be avoided or reduced to such an extent that they are not problematic when the impeller wheel is in use.

Figure 4C:
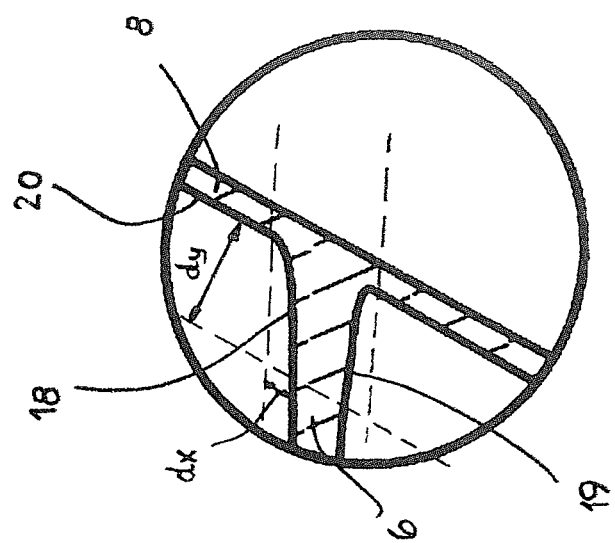
Figure 4B:
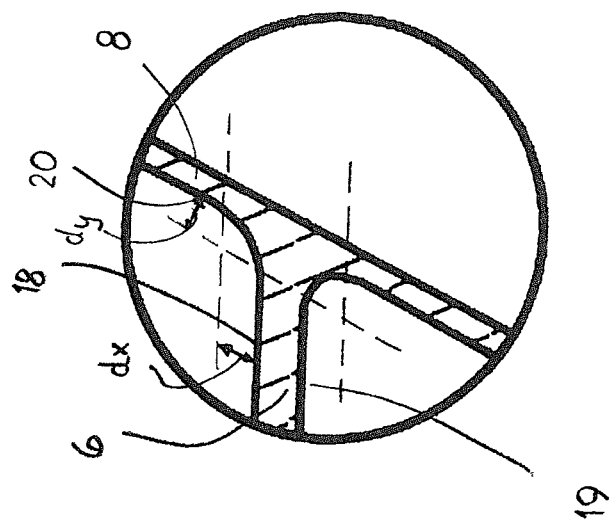
Figure 4A:
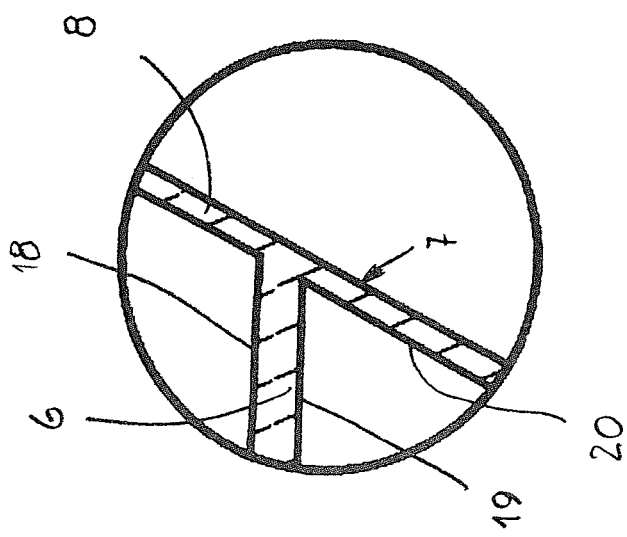

In the embodiment according to FIG. 4a the two outer sides 18, 19 of the blade 6 each have a sharp-edge transition to the inner side 20 of the jacket 8 of the bottom disc 7. Because of the sharp-edged transition, during operation of the impeller wheel greater stress peaks occur that are (inked to a stress concentration. Correspondingly, the blade 6 and the jacket 8 have such a wall thickness that no fracture or failure in this transitional region occurs.

In the embodiment according to FIG. 4b the outer sides 18, 19 of the blade 6 have a rounded transition to the inner side 20 of the jacket 8. The rounded shape is designed in such a manner that it extends approximately across the same distance in the blade direction dy as in the cover disc/bottom disc direction dx. Because of the rounded shape, the cross section in the transitional region steadily increases from the blade 6 to the jacket 8. Because of this design, only very low stress peaks occur in the transitional region during operation.

In the exemplary embodiment according to FIG. 4c the design of the rounding is different on each side of the blade 6. The extension of the rounded region in the transitional region matches the load occurring in operation. Thus, the transition extending in the blade direction dy is significantly greater than the region extending in the direction dx of the cover disc 1/bottom disc 7. For example, the transitional region dy is greater than approximately 1.5 dx. As a result of this non-uniform design of the transitional region between the blade 6 and the cover disc 1/bottom disc 7 the impeller wheel can be optimally matched to the loads to be expected in operation.

Figure 5:
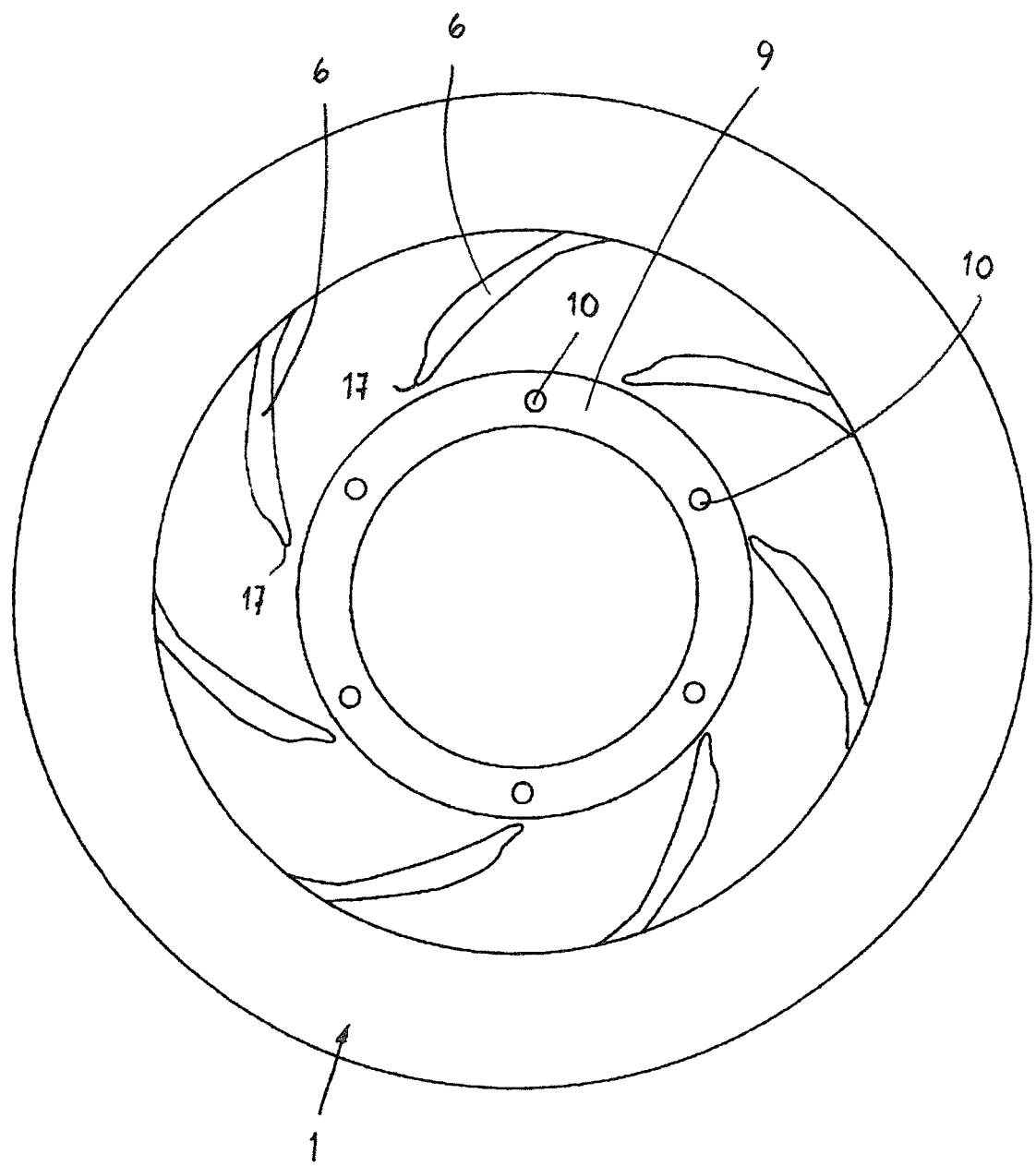

The impeller wheel according to FIGS. 1, 2 and 5 is intended for motors with a small interface diameter. The motor can be screwed to the ring-shaped motor connection 9. As shown in FIG. 5, the leading edges 17 of the blades 6 maintain a radial distance from the motor connection 9, when viewed in the axial direction of the impeller wheel. Thus, the motor with its corresponding interface can easily be screwed to the ring-shaped motor connection 9.

Figure 6:
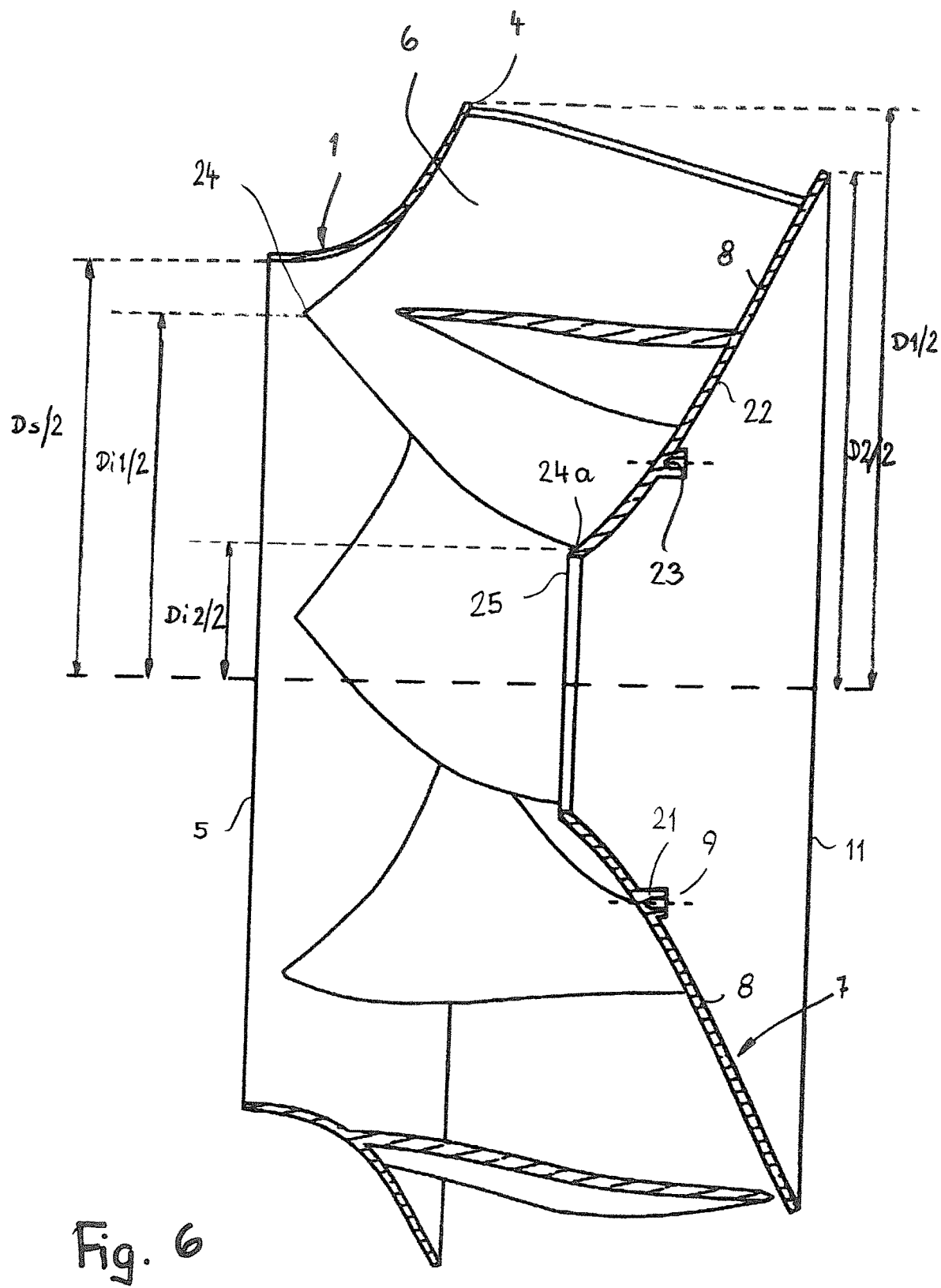
Figure 6A:
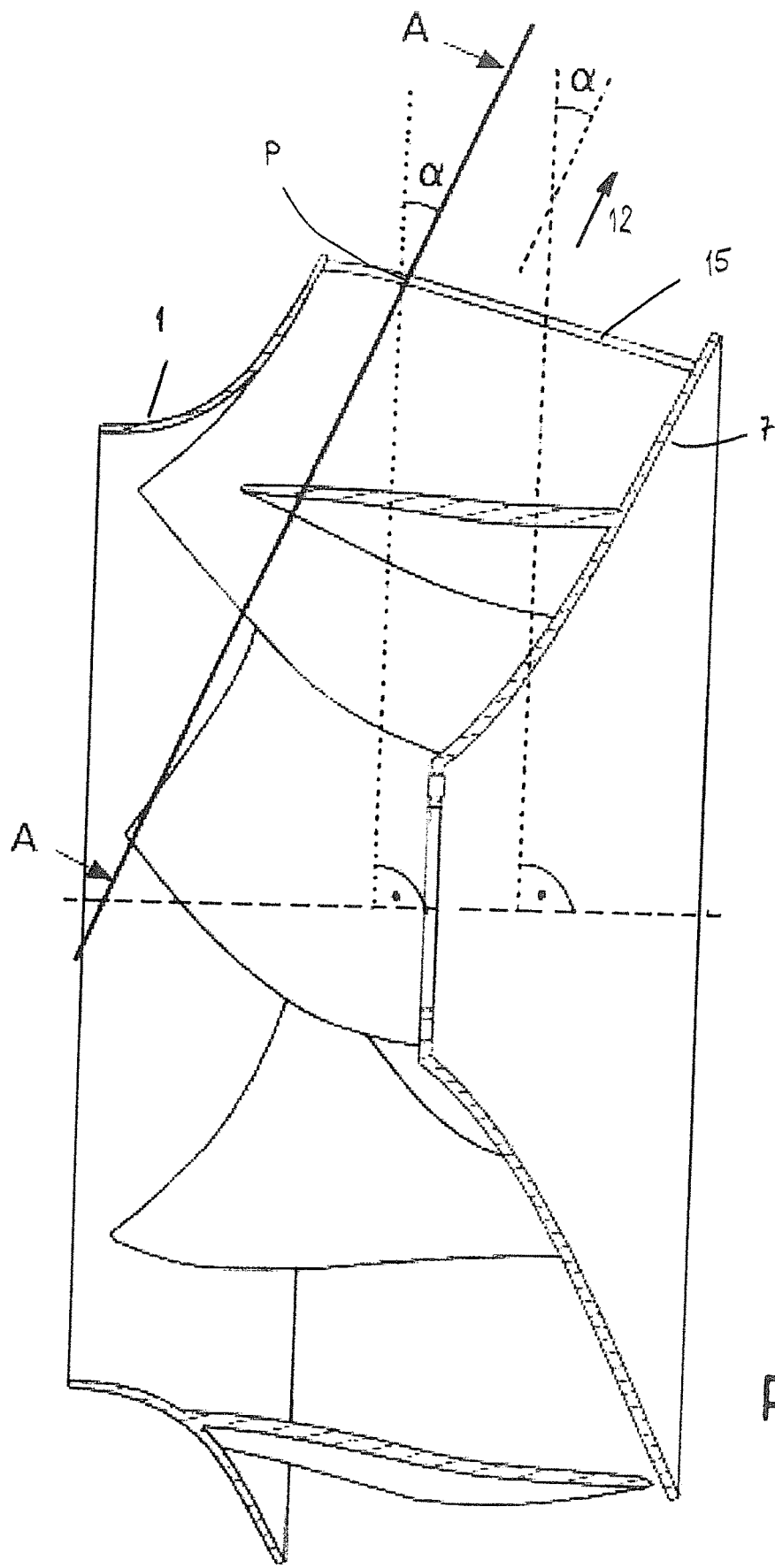
Figure 6B:
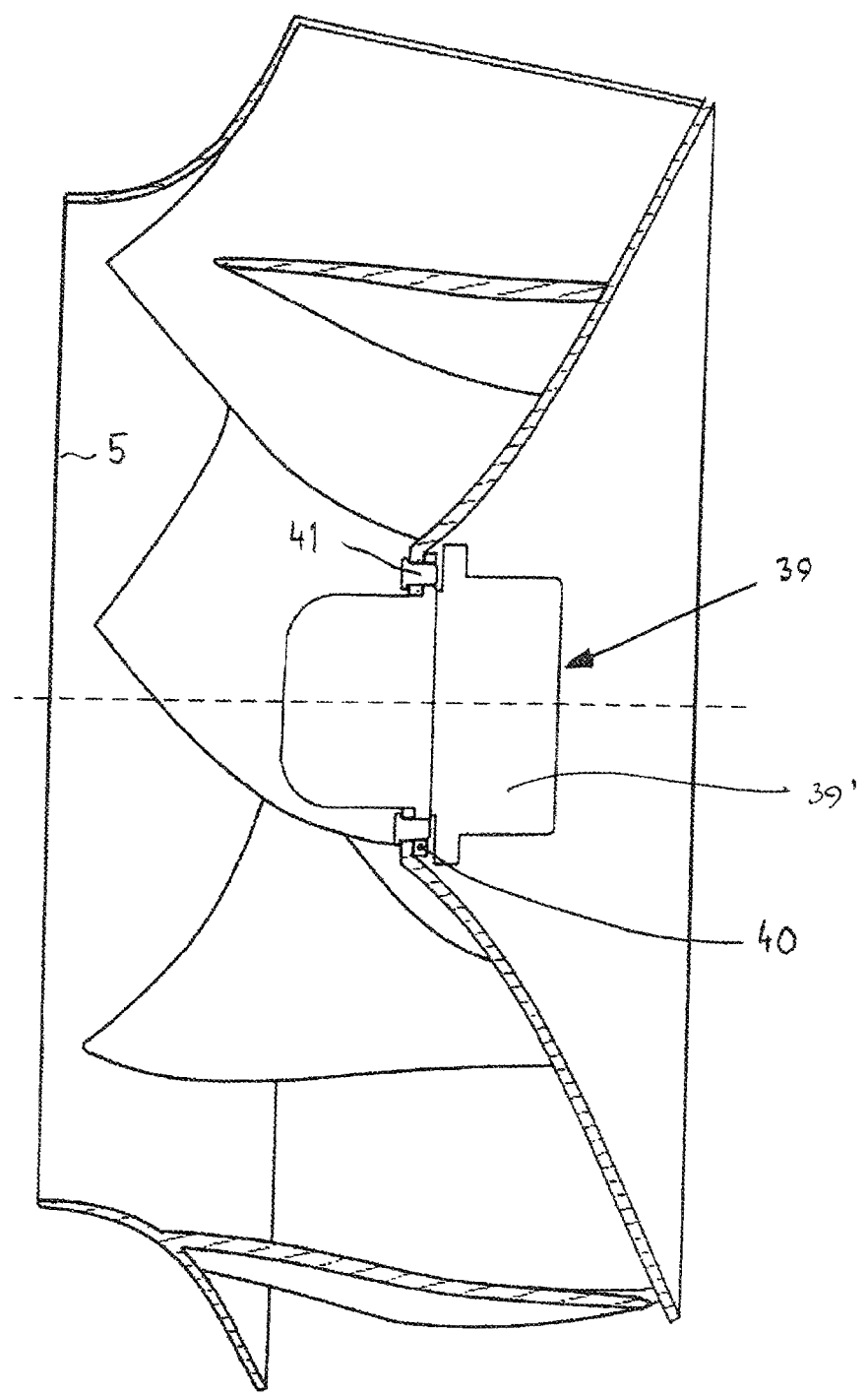

FIG. 6b shows such an impeller wheel with the screwed-on motor 39. The motor 39, whose rotating flange 40 comprises threaded holes, is fastened with screws 41 that have been screwed in from the direction of the air intake opening 5. It is also imaginable for the motor flange 40 not to comprise any threaded holes, but instead for the screws 41 to be fastened to the motor 39 with nuts. The stationary part 39' of the (external rotor) motor 39 is mounted in the known manner.

In an advantageous embodiment metal sleeves have been inserted in the through-aperture 10 of the plastic impeller wheel, which results in improved strength of the screw connections.

In contrast to the above, if the impeller wheel is to be used for motors 39 with a larger interface diameter, the motor connection 9 is provided in the region of the jacket 8 of the bottom disc 7 (FIG. 6). The motor connection 9 is formed by support sleeves 21 that are arranged so as to be spaced apart, one behind the other, in the circumferential direction, which support sleeves 21 project from the outer side 22 of the jacket 8 of the bottom disc 7. Each of the support sleeves 21 comprises an indentation 23 for receiving fastening screws by means of which the motor 39 can be screwed on by way of its corresponding interface. The motor 39 can also be connected to the motor connection 9 by way of an additional adapter piece made of sheet metal or plastic material. The bottom disc 7 according to FIG. 6 differs from the previous embodiment in that it does not comprise an annular disc on its tapered end. Apart from that the bottom disc 7 can comprise the same design as the previous embodiment. Since the support sleeves 21 are provided on the outer side 22 of the jacket 8, which outer side 22 faces away from the cover disc 1, the impeller wheel can easily be connected to the motor 39.

To make it possible to easily manufacture the impeller wheel with the different motor connections 9, merely different inserts for injection molding tools are used, which will be explained with reference to FIGS. 7 to 10. In this manner impeller wheels for different-size motors can be manufactured very easily in an injection molding process.

The impeller wheels described have characteristic dimensions or dimension ratios, by means of which easy manufacture of the impeller wheels in an injection molding process is possible.

In the region of the inlet 5 the cover disc 1 has the internal diameter Ds. The ends 24 of the blades 6, which ends 24 are adjacent to the inlet 5, are arranged on a circle with the diameter Di1. The ends 24a of the blades 6, which ends 24a are located on the bottom disc 7, are arranged on a circle with the diameter Di2, when viewed in the axial section. In the region of the air outlet 4 the cover disc 1 has the diameter D1. On the free edge 11 the bottom disc 7 has the diameter D2.

In FIG. 6 it is not the above-mentioned diameters that are shown, but instead the associated radii in the form of Ds/2, Di1/2, Di2/2, D1/2 and D2/2.

In the diagram according to FIG. 6 the ends 24 of the blades 6 are not situated in the drawing plane; instead they are rearwards offset in relation to the drawing plane. The blade ends 24 are situated on the jacket 3 of the cover disc 1. Depending on the shape of the jacket 3, the diameter Di1 can thus equal the diameter Ds, but it can also be smaller or greater than said diameter Ds.

The diameters D1 and D2 as well as Di1 and Di2 in each case differ in determined ratios. Moreover, in the impeller wheel the ratio Ds/D1 is relatively high, for example, in a range greater than approximately 0.6, preferably 0.7 to 0.85. This diameter ratio results in the impeller wheel featuring low-noise operation. As a result of the high ratio Ds/D1 the fan can convey a large air volume flow.

The diameter D2 is smaller than or equal to D1. Preferably, D2 is in the range of 0.8*D1 to 0.95*D1. Such a selection of D2 makes it possible to achieve a large air volume flow because the airflow on the bottom disc 7 is not deflected as far in the radial direction.

The fact that the diameters D1 and D2 are matched to each other so that the air outlet (airflow arrows 12) features an optimal design and contributes to low-noise operation of the fan further contributes to the above.

The diameter Di2 is significantly smaller than Di1. In an advantageous embodiment, Di2 is in the range of 0.2*Di1 to 0.5*Di1. This results in high efficiency factors and low acoustics. Furthermore, this ratio also characterises the three-dimensional nature and complexity of the impeller wheel geometry, whose single-part demolding from an injection molding tool is a challenge.

The blades 6 are also designed in such a manner that they generate little noise during operation of the impeller wheel, but at the same time optimally convey the air.

The described impeller wheels are characterised by high efficiency factors and particularly low noise levels. The impeller wheels are economical to produce in that they are, in particular, manufactured in one piece. Particularly advantageously, the impeller wheels are made from a fibre-reinforced plastic material as injection molded parts. Consequently, the impeller wheels not only distinguish themselves by their light weight, but also by their high strength. As a result of the special design of the transition between the blades 6 and the jacket 8 of the bottom disc 7, or the jacket 3 of the cover disc 1, the blades 6 can have very thin walls without this negatively affecting the strength. As has been described with reference to FIG. 4c, the transition between the blades 6 and the cover disc 1, or the bottom disc 7, can match the loads experienced in this region during operation of the impeller wheel. The rounded shape at the transition from the blade 6 to the cover disc 1, or to the bottom disc 7, is selected in such a manner that the transitional region withstands the loads experienced during operation of the impeller wheel. The blades 6 themselves can therefore feature a very thin-walled construction, which not only contributes to the light weight of the impeller wheel, but also significantly contributes to saving plastic material in the manufacture of the impeller wheel.

Figure 7:
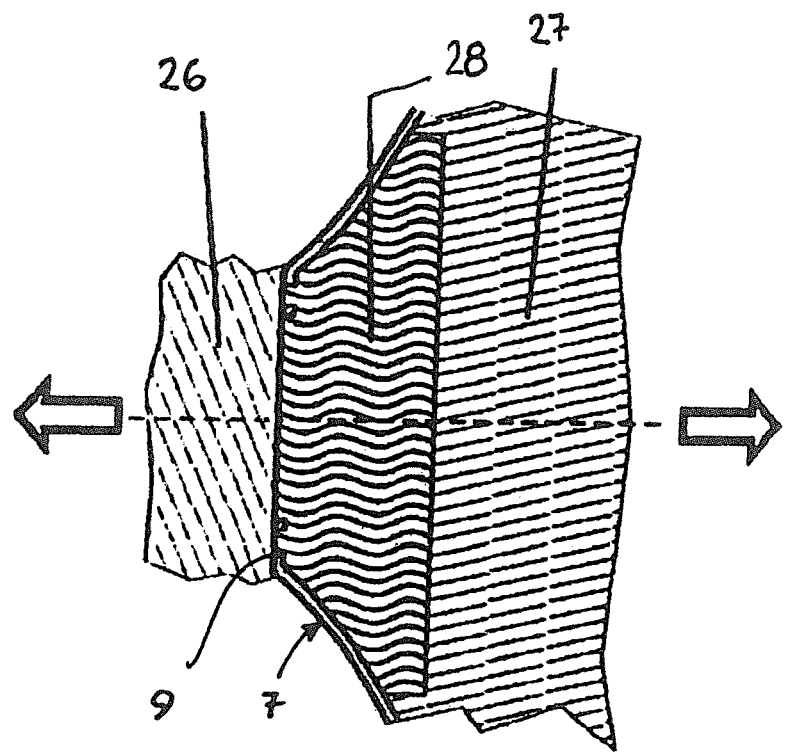
Figure 8:
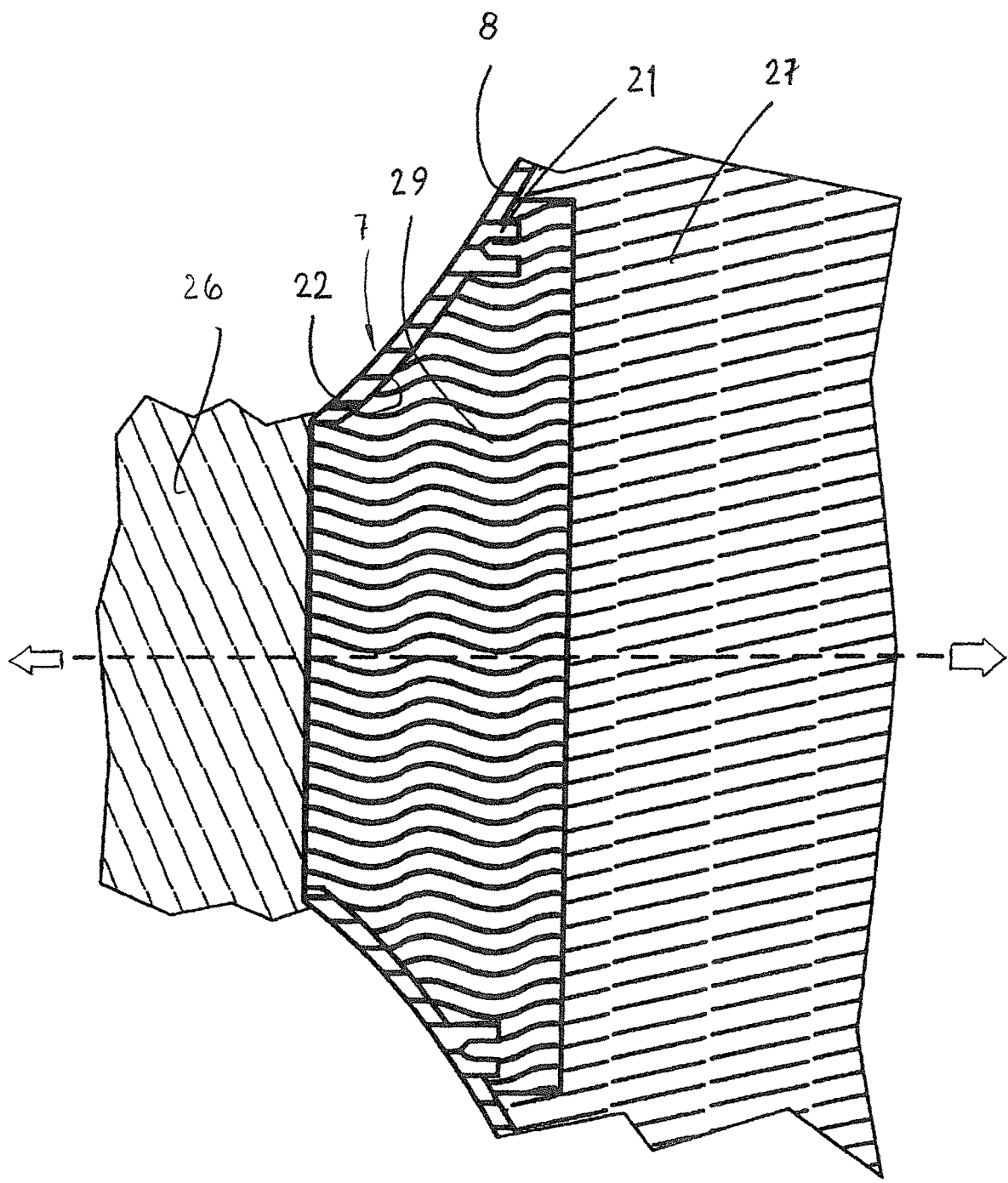

Below, the manufacture of the different impeller wheels in an injection molding tool is described. FIG. 7 diagrammatically shows an injection molding tool by means of which the impeller wheel according to FIGS. 1, 2 and 5 can be manufactured, in which the motor connection 9 is formed by the annular disc on the inner edge of the bottom disc 7. The injection molding tool has two sliders 26, 27, each arranged on one side of a mold insert 28 by means of which the bottom disc 7 with the annular disc 9 is manufactured. Together with further injection molding parts (not shown), the mold insert 28 delimits the cavity into which the plastic material is injected in the manufacture of the bottom disc 7. On completion of the injection process the two sliders 26, 27, each situated on one side of the mold insert 28, can be moved away from each other in opposite directions as indicated by the arrows.

If a impeller wheel according to FIG. 6 is to be manufactured in which the motor connection 23 is not located on the inner edge of the bottom disc 7, instead of the mold insert 28 a mold insert 29 (FIG. 8) is used that is designed in such a manner that the support sleeves 21 on the outer side 22 of the jacket 8 of the bottom disc 7 can be manufactured. The sliders 26, 27 remain identical.

In the described manner, with the use of different inserts the bottom disc 7 can in each case be manufactured so that motors of different sizes can be connected to the impeller wheel.

In the motor connection 9 according to FIGS. 1, 2 and 5 the fastening screws are screwed from the inlet side 5 through the apertures 10 into the motor flange 40. The drive motor itself is situated on the region encompassed by the bottom disc 7.

In an impeller wheel according to FIG. 6, the screws are screwed from the side of the bottom disc 7 through the motor flange or adapter flange directly into the support sleeves 21 of the bottom disc 7. Advantageously, self-tapping and self-securing plastic screws are screwed directly into the support sleeves 21. However, it is also possible for metal bushes with threads to be inserted in the support sleeves 21, into which metal bushes the fastening screws are screwed.

Figure 9:
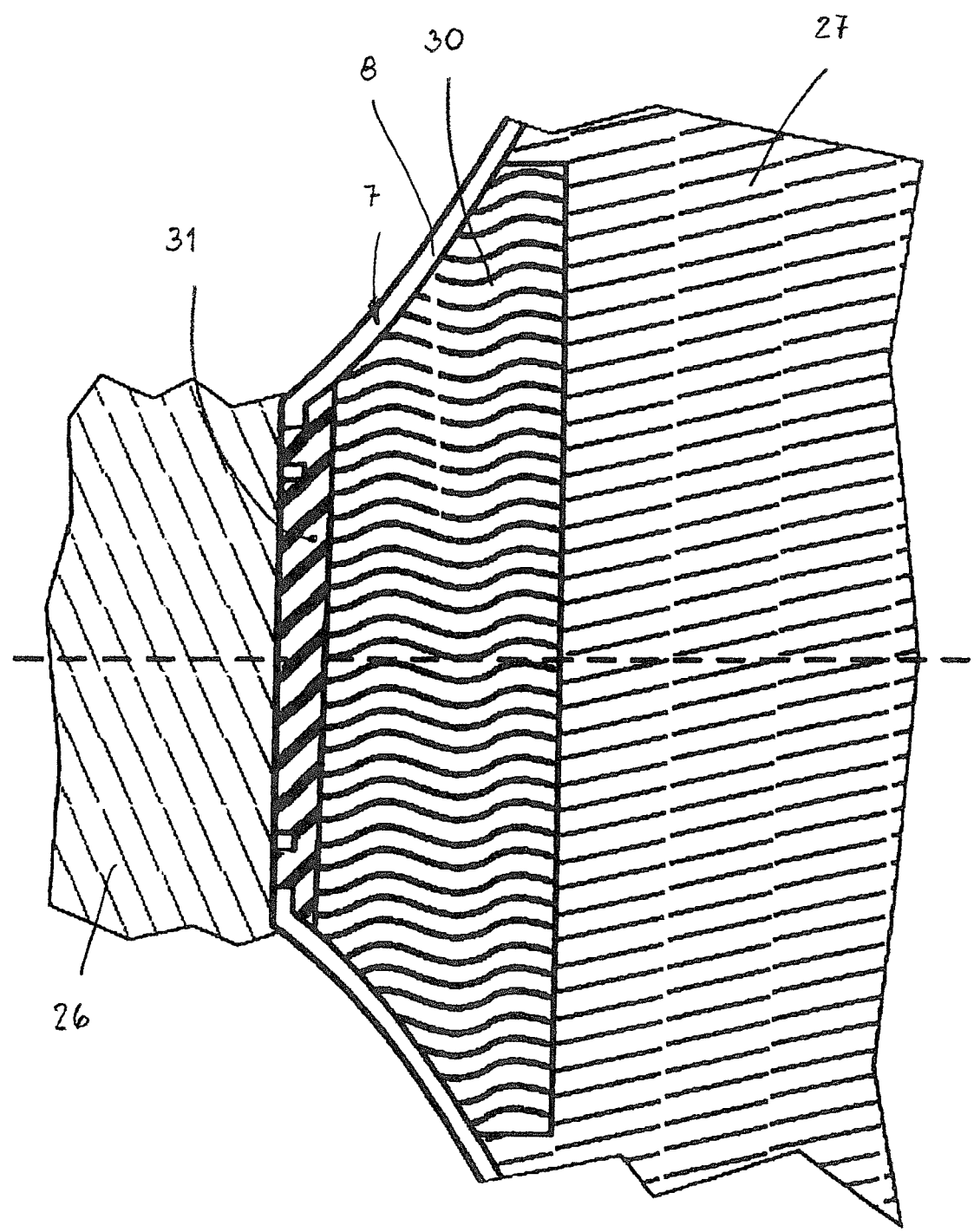

FIG. 9 shows a further exemplary embodiment of an injection molding tool by means of which the bottom disc 7 according to FIGS. 1, 2 and 5 can be manufactured. In contrast to the embodiment according to FIG. 7, two mold inserts 30, 31 are used that are situated between the sliders 26, 27 of the injection molding tool. The mold insert 30 forms an adapter insert into which different mold inserts can be placed in order to manufacture different motor connections. The mold insert 30 is designed in such a manner that it essentially forms the jacket 8 of the bottom disc 7. The significantly smaller mold insert 31 is used to manufacture the remaining part of the jacket 8 and of the motor connection 9 of the bottom disc 7.

Figure 10:
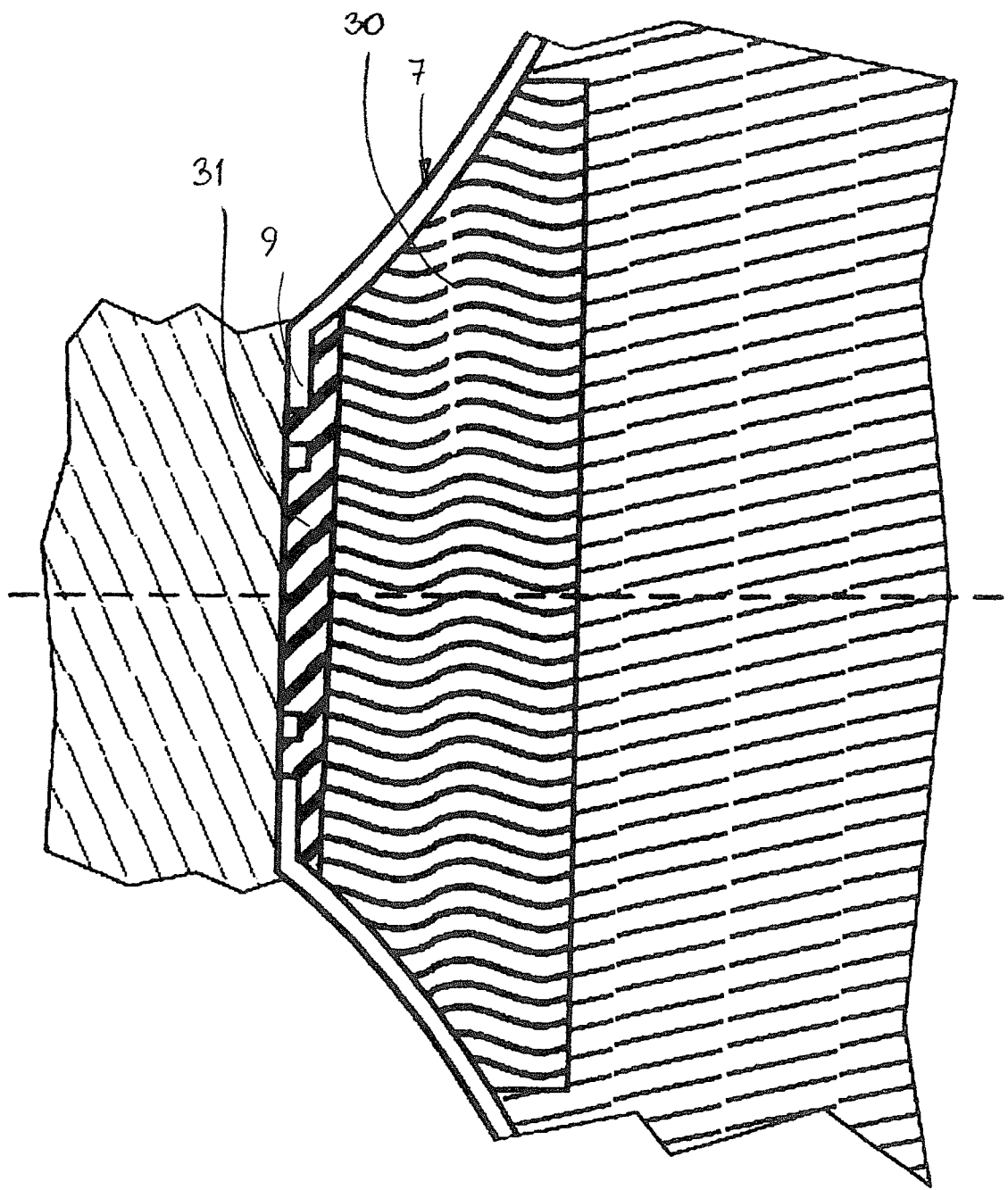

As shown in FIG. 10, by way of exchanging the small mold insert 31 some other form of the motor connection 9 of the bottom disc 7 can be manufactured. The mold insert 30 is identical to the mold insert of the injection molding tool according to FIG. 9.

The two examples with the mold inserts 31 show that with the use of very small mold inserts different motor connections 9 can be manufactured in a simple manner. The adapter insert 30 makes it possible to save tool costs if different designs of the motor connections 9 on the inner end of the bottom disc 7 are to be manufactured.

Figure 11:
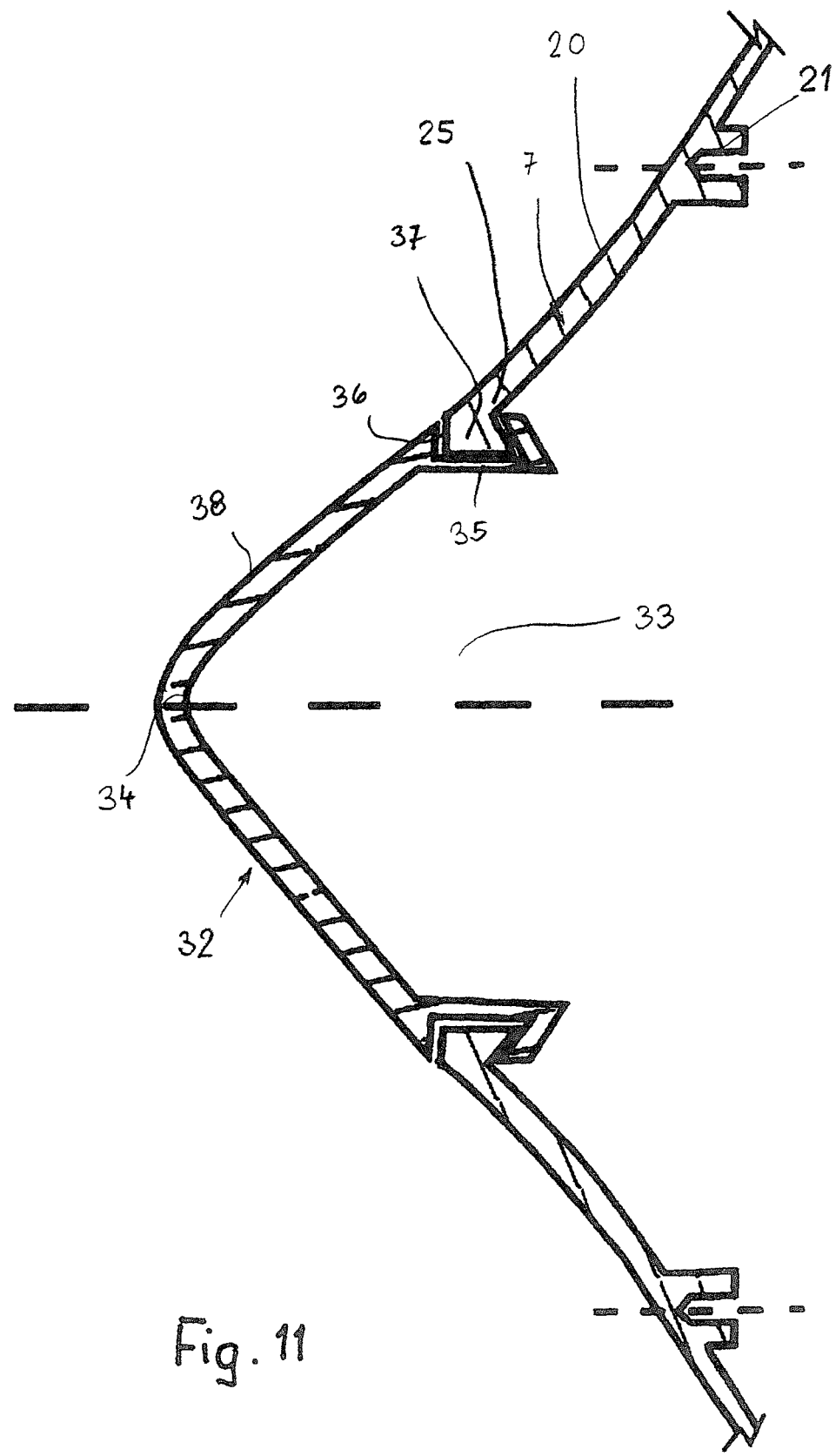

FIG. 11 shows the option of providing, on the bottom disc 7, a flow cap 32 by means of which the dynamic flow in the region of the motor connection can be improved. The flow cap 32 can subsequently be affixed to the impeller wheel. The design of said flow cap 32 can be designed, for example, depending on the motor used, its external geometry, and its thermal behaviour. In the exemplary embodiment the flow cap 32 is of a closed design, and thus closes the aperture 33 in the middle of the bottom disc 7. The flow cap 32 can also comprise a central aperture which, for example, leaves space for part of the motor, for example for a motor flange.

The flow cap 32 shown is approximately conical in shape with a rounded cone tip 34, and on its free edge comprises at least one fastening element 35 by means of which it can be fastened to the bottom disc 7. The fastening element 35 is, for example, a circumferential ring with an external annular groove 36 which is engaged by a mold piece 37 on the edge 25 of the bottom disc 7. The mold piece 37 and the annular groove 36 engage each other in the manner of a dovetail groove, and consequently the flow cap 32 is securely connected to the bottom disc 7.

The exterior side 38 of the flow cap 32 forms an essentially steady continuation of the inner side 20 of the bottom disc 7.

The flow cap 32 can be connected in any suitable manner to the bottom disc 7, for example with the use of snap-in hooks, by means of a screw connection, and the like.

The described impeller wheels are suitable, in particular, for use in operating points with rather low flow resistance. The impeller wheels feature a compact design, and consequently they can also be used in confined installation situations. Because of their single-part design the impeller wheels can be manufactured economically with corresponding injection molding tools.

Figure 13:
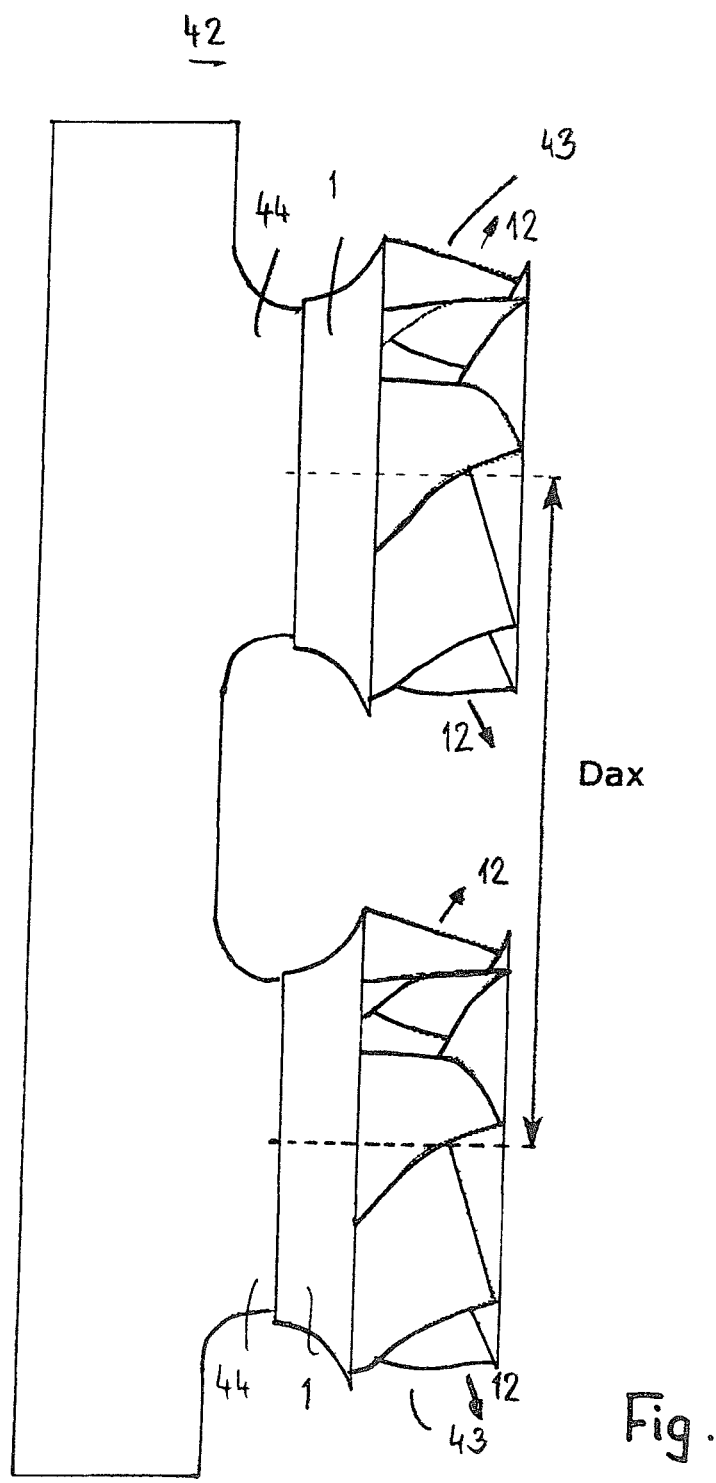

FIG. 13 shows a device 42, which can, for example, be a chipping device, a roof fan or a heat pump, to which device 42 the two fans 43 with impeller wheels according to the invention are attached. These fans 43 remove air from the device 42 by suction. The design of the impeller wheel makes it possible to closely arrange several fans 43 side by side, without this resulting in substantial reductions in terms of the efficiency factor or the acoustics. The reason for this lies above all in the selection of the outflow angle α, and also in the three-dimensional blade geometry. It is now possible, in a very compact arrangement to arrange in parallel two or several fan impeller wheels according to the invention with an axial distance Dax of 1.75*D1 or less (in particular 1.4 ... 1.7*D1), while at the same time achieving low-noise and energy-efficient operation.

The fans 43 can be arranged side by side and/or one above the other. The number of fans 43 can be selected depending on the device 42 to be cooled. By way of its cover disc 1, each fan is connected to an inlet nozzle 44 of the device 42. Since the airflows from the fans exit obliquely outwards in the direction of the airflow arrows 12, the fans can be arranged relatively tightly side by side on the device 42 without the airflows 12 emanating from the fans impeding each other.

Figure 14:
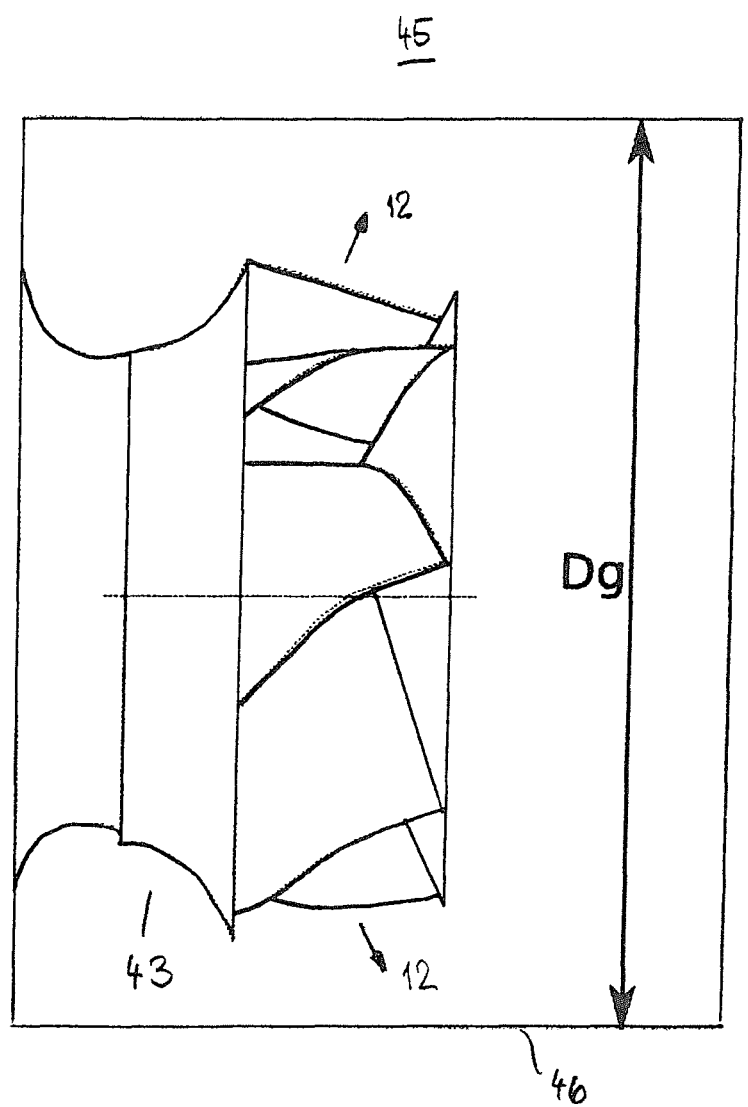

FIG. 14 shows a device 45 which can, for example, be an air conditioner cabinet or a tube fan, in which device 45 a fan 43 with an impeller wheel according to the invention pushes air from the left-hand side into the device 45. The shape of the diameter of the device wall 46 can be round (tube) or rectangular (air conditioning cabinet). On the downstream side the sidewalls 46 impede the airflow due to design or space constraints. Because of the special shape of the impeller wheel according to the invention the impeding device walls 46 can be in close proximity to the fan 43 without this resulting in significant loss (acoustics, efficiency factor). This makes it possible to achieve a very compact design. The distance Dg between the device walls 46 can be selected to be <1.75*D1, in particular 1.4*D1 to 1.7*D1.

The described impeller wheels can be used for a host of different devices and fans. For example, the impeller wheels can advantageously be used in rectangular fans or tubular fans, in precision air-conditioning devices, in heat pumps, in compact or box-type air-conditioning units, in electronics cooling, in generator cooling, in ventilation boxes or domestic ventilation units.

The specification incorporates by reference the entire disclosure of German priority document 10 2014 006 756.4 having a filing date of May 5, 2014.

While specific embodiments of the invention have been shown and described in detail to illustrate the inventive principles, it will be understood that the invention may be embodied otherwise without departing from such principles.

What is claimed is:

1. An impeller wheel for diagonal or radial fans, the impeller wheel comprising:
   a bottom disc (7);
   a cover disc (1);
   three-dimensionally shaped blades (6) connected to the bottom disc (7) and the cover disc (1), wherein the bottom disc (7), the cover disc (6), and the three-dimensionally shaped blades (6) together form a monolithic part;
   wherein the three-dimensionally shaped blades (6) each comprise a leading edge, extending from the bottom disc (7) to the cover disc (1), and a trailing edge, extending from the bottom disc (7) to the cover disc (1), wherein the leading edge and the trailing edge each have a median diameter;
   wherein, in a projection onto a cylinder that is coaxial to a rotation axis (13) of the impeller wheel and has a diameter matching a median diameter of the trailing edge or of the leading edge, a first extension of the trailing edge at the cover disc (1) is positioned at a first angle ($\beta1$), measured between a tangent to the trailing edge at the cover disc (1) and a line that is parallel to the rotation axis (13), and a second extension of the trailing edge at the bottom disc (7) is positioned at a second angle ($\beta2$)), measured between a tangent to the trailing edge at the bottom disc (7) and a line that is parallel to the rotation axis (13), wherein at least one of the first and second angles ($\beta1$, $\beta2$) is different from 0°.

2. The impeller wheel according to claim 1, wherein a diameter of the cover disc (1), when viewed in an axial section view, increases from an air inlet (5) of the impeller wheel in a direction toward an air outlet (4) of the impeller wheel.

3. The impeller wheel according to claim 2, wherein a generatrix of the cover disc (1) is curved such that the diameter of the cover disc (1) steadily increases from the air inlet (5) in the direction toward the air outlet (4).

4. The impeller wheel according to claim 3, wherein the generatrix extends in a straight line at a distance from the air inlet (5).

5. The impeller wheel according to claim 1, wherein a diameter of the bottom disc (7), when viewed in an axial section view, increases in a direction away from a side of the bottom disc (7) that is facing the cover disc (1).

6. The impeller wheel according to claim 5, wherein a generatrix of the bottom disc (7) extends in a curved shape in the direction away from the side facing the cover disc such that the diameter of the bottom disc (7) increases.

7. The impeller wheel according to claim 6, wherein the generatrix extends in a straight line at a distance from an end of the generatrix facing the cover disc (1).

8. The impeller wheel according to claim 1, wherein the bottom disc has a free edge positioned at a third angle ($\alpha2$), viewed in an axial section view, relative to a radial line, wherein the cover disc (1) has an end defining an air outlet (4) and the end defining the air outlet (4) is positioned at a fourth angle ($\alpha1$), viewed in an axial section view, relative to a radial line, wherein the third angle is smaller than the fourth angle.

9. The impeller wheel according to claim 1, wherein a transitional region of the blades into the cover disc (1) and/or into the bottom disc (7) has a rounded shape.

10. The impeller wheel according to claim 9, wherein the transition region of the blades (6) into the cover disc (1) and/or into the bottom disc (7) has a different width on opposed sides of the blades (6).

11. The impeller wheel according to claim 9, wherein the rounded shape in a direction (dy) of the blades away from the bottom disc differs in width from the rounded shape in a direction (dx) of the bottom disc (7) away from the blades.

12. The impeller wheel according to claim 9, wherein the rounded shape in a direction (dy) of the blades away from the cover disc differs in width from the rounded shape in a direction (dx) of the cover disc away from the blades.

13. The impeller wheel according to claim 1, wherein the bottom disc (7) comprises an interface (9, 21) configured to connect the impeller wheel to a motor (39).

14. The impeller wheel according to claim 13, wherein the interface (9) is a ring-shaped disc provided on an inner edge of the bottom disc (7).

15. The impeller wheel according to claim 13, wherein the interface (9) is situated within a region covered by the blades (6), when viewed in the axial direction of the impeller wheel.

16. The impeller wheel according to claim 13, wherein the interface (21) is positioned at a distance from an inner edge of the bottom disc (7) and is formed by support sleeves that protrude from an outer side (22) of the bottom disc (7) that is facing away from the cover disc.

17. The impeller wheel according to claim 16, wherein self-tapping plastic screws are screwed into the support sleeves for connecting the impeller wheel to the motor.

18. The impeller wheel according to claim 1, further comprising a flow cap (32) placed onto an inner edge of the bottom disc (7).

19. The impeller wheel according to claim 18, wherein the flow cap (32) has an exterior side (38) that forms at least approximately a steady continuation of an inner side (20) of the bottom disc (7) that is facing the cover disc.

20. The impeller wheel according to claim 1, wherein the first and second angles ($\beta1$, $\beta2$) differ from each other.

21. The impeller wheel according to claim 20, wherein the first angle ($\beta1$) is greater than the second angle ($\beta2$).

22. An injection molding tool for manufacturing the impeller wheel according to claim 1, the injection molding tool comprising:
   molding parts into which a plastic material is injected to manufacture the impeller wheel, wherein the molding parts include at least one mold insert and two sliders for manufacturing the bottom disc (7) with an interface (9, 21), wherein the at least one mold insert is arranged between the two sliders.

23. The injection molding tool according to claim 22, wherein the at least one mold insert (30) is an adapter insert into which auxiliary mold inserts (31) for forming the interface (9, 21) are inserted.

24. A device comprising at least one fan (43) with an impeller wheel according to claim 1.

25. The device according to claim 24, wherein the device (42) comprises at least two fans (43), arranged side by side.

26. The device according to claim 25, wherein an axial distance (Dax) between the at least two fans (43) is at most approximately 1.75*D1, wherein D1 denotes a diameter of the cover disc (1) in a region of an air outlet (4) of the cover disc.

27. The device according to claim 24, comprising an interior space that is connected to a pressure side of the at least one fan, wherein the interior space has a diameter or a radial sidewall distance (Dg) of at most approximately 1.75*D1, wherein D1 denotes the diameter of the cover disc (1) in a region of an air outlet (4) of the cover disc.

28. An impeller wheel for diagonal or radial fans, the impeller wheel comprising:
a bottom disc (7);
a cover disc (1);
three-dimensionally shaped blades (6) connected to the bottom disc (7) and the cover disc (1), wherein the bottom disc (7), the cover disc (6), and the three-dimensionally shaped blades (6) together form a monolithic, injection-molded part of plastic material;
wherein the three-dimensionally shaped blades (6) each comprise a leading edge, extending from the bottom disc (7) to the cover disc (1), and a trailing edge, extending from the bottom disc (7) to the cover disc (1), wherein the leading edge and the trailing edge each have a median diameter;
wherein, in a projection onto a cylinder that is coaxial to a rotation axis (13) of the impeller wheel and has a diameter matching a median diameter of the trailing edge or of the leading edge, a first extension of the trailing edge and/or of the leading edge at the cover disc (1) is positioned at a first angle ($\beta 1$), measured between a tangent to the trailing edge and/or to the leading edge at the cover disc and a line that is parallel to the rotation axis (13), and a second extension of the trailing edge and/or of the leading edge at the bottom disc is positioned at a second angle ($\beta 2$), measured between a tangent to the trailing edge and/or to the leading edge at the bottom disc and a line that is parallel to the rotation axis (13), wherein the first and second angles ($\beta 1$, $\beta 2$) differ from each other by at least 10°, wherein the first and second angles ($\beta 1$, $\beta 2$) each are greater than 10°, and wherein the first angle ($\beta 1$) is greater than the second angle ($\beta 2$).

29. An impeller wheel for diagonal or radial fans, the impeller wheel comprising:
a bottom disc (7);
a cover disc (1);
three-dimensionally shaped blades (6) connected to the bottom disc (7) and the cover disc (1), wherein the bottom disc (7), the cover disc (6), and the three-dimensionally shaped blades (6) together form a monolithic part;
wherein the three-dimensionally shaped blades (6) each comprise a leading edge, extending from the bottom disc (7) to the cover disc (1), and a trailing edge, extending from the bottom disc (7) to the cover disc (1), wherein the leading edge and the trailing edge each have a median diameter;
wherein, in a projection onto a cylinder that is coaxial to a rotation axis (13) of the impeller wheel and has a diameter matching a median diameter of the trailing edge or of the leading edge, a first extension of the trailing edge and/or of the leading edge at the cover disc is positioned at a first angle ($\beta 1$), measured between a tangent to the trailing edge and/or to the leading edge at the cover disc and a line that is parallel to the rotation axis (13), and a second extension of the trailing edge and/or the leading edge at the bottom disc is positioned at a second angle ($\beta 2$), measured between a tangent to the trailing edge and/or to the leading edge at the bottom disc and a line that is parallel to the rotation axis (13), wherein the first and second angles ($\beta 1$, $\beta 2$) are greater than 10°, wherein the first and second angles ($\beta 1$, $\beta 2$) differ from each other by at least 10°, and wherein the first angle ($\beta 1$) is greater than the second angle ($\beta 2$).

30. An impeller wheel for diagonal or radial fans, the impeller wheel comprising:
a bottom disc (7);
a cover disc (1);
three-dimensionally shaped blades (6) connected to the bottom disc (7) and the cover disc (1), wherein the bottom disc (7), the cover disc (6), and the three-dimensionally shaped blades (6) together form a monolithic, injection-molded part;
wherein the three-dimensionally shaped blades (6) each comprise a leading edge, extending from the bottom disc (7) to the cover disc (1), and a trailing edge, extending from the bottom disc (7) to the cover disc (1), wherein the leading edge and the trailing edge each have a median diameter;
wherein, in a projection onto a cylinder that is coaxial to a rotation axis (13) of the impeller wheel and has a diameter matching a median diameter of the trailing edge or of the leading edge, a first extension of the trailing edge and/or of the leading edge at the cover disc is positioned at a first angle ($\beta 1$), measured between a tangent to the trailing edge and/or to the leading edge at the cover disc and a line that is parallel to the rotation axis (13), and a second extension of the trailing edge and/or of the leading edge at the bottom disc is positioned at a second angle ($\beta 2$), measured between a tangent to the trailing edge and/or to the leading edge at the bottom disc and a line that is parallel to the rotation axis (13), wherein the first and second angles ($\beta 1$, $\beta 2$) are greater than 10°, wherein the first and second angles ($\beta 1$, $\beta 2$) differ from each other by at least 10°, and wherein the first angle ($\beta 1$) is greater than the second angle ($\beta 2$).

31. An impeller wheel for diagonal or radial fans, the impeller wheel comprising:
a bottom disc (7);
a cover disc (1);
three-dimensionally shaped blades (6) connected to the bottom disc (7) and the cover disc (1), wherein the bottom disc (7), the cover disc (6), and the three-dimensionally shaped blades (6) together form a monolithic part;

wherein the three-dimensionally shaped blades (6) each comprise a leading edge and a trailing edge, wherein the leading edge and the trailing edge each have a median diameter;

wherein, in a projection onto a cylinder that is coaxial to a rotation axis (13) of the impeller wheel and has a diameter matching a median diameter of the trailing edge or of the leading edge, a first extension of the trailing edge and a first extension of the leading edge are positioned at a first angle ($\beta 1$) relative to a line that is parallel to the rotation axis (13), and a second extension of the trailing edge and a second extension of the leading edge are positioned at a second angle ($\beta 2$) relative to a line that is parallel to the rotation axis (13), wherein at least one of the first and second angles ($\beta 1$, $\beta 2$) is different from 0°.

32. An impeller wheel for diagonal or radial fans, the impeller wheel comprising:

a bottom disc (7);

a cover disc (1);

three-dimensionally shaped blades (6) connected to the bottom disc (7) and the cover disc (1), wherein the bottom disc (7), the cover disc (6), and the three-dimensionally shaped blades (6) together form a monolithic part;

wherein the three-dimensionally shaped blades (6) each comprise a leading edge, extending from the bottom disc (7) to the cover disc (1), and a trailing edge, extending from the bottom disc (7) to the cover disc (1), wherein the leading edge and the trailing edge each have a median diameter;

wherein, in a projection onto a cylinder that is coaxial to a rotation axis (13) of the impeller wheel and has a diameter matching a median diameter of the trailing edge or of the leading edge, a first extension of the trailing edge at the cover disc is positioned at a first angle ($\beta 1$), measured between a tangent to the trailing edge at the cover disc and a line that is parallel to the rotation axis (13), and a second extension of the trailing edge at the bottom disc is positioned at a second angle ($\beta 2$), measured between a tangent to the trailing edge at the bottom disc and a line that is parallel to the rotation axis (13), wherein the first and second angles ($\beta 1$, $\beta 2$) differ from each other by at least 10°, wherein the first and second angles ($\beta 1$, $\beta 2$) each are greater than 10°, and wherein the first angle ($\beta 1$) is greater than the second angle ($\beta 2$).

33. An impeller wheel for diagonal or radial fans, the impeller wheel comprising:

a bottom disc (7);

a cover disc (1);

three-dimensionally shaped blades (6) connected to the bottom disc (7) and the cover disc (1), wherein the bottom disc (7), the cover disc (6), and the three-dimensionally shaped blades (6) together form a monolithic part;

wherein the three-dimensionally shaped blades (6) each comprise a leading edge, extending from the bottom disc (7) to the cover disc (1), and a trailing edge, extending from the bottom disc (7) to the cover disc (1), wherein the leading edge and the trailing edge each have a median diameter;

wherein, in a projection onto a cylinder that is coaxial to a rotation axis (13) of the impeller wheel and has a diameter matching a median diameter of the trailing edge or of the leading edge, a first extension of the leading edge at the cover disc is positioned at a first angle ($\beta 1$), measured between a tangent to the leading edge at the cover disc and a line that is parallel to the rotation axis (13), and a second extension of the leading edge at the bottom disc is positioned at a second angle ($\beta 2$), measured between a tangent to the leading edge at the bottom disc and a line that is parallel to the rotation axis (13), wherein at least one of the first and second angles ($\beta 1$, $\beta 2$) is different from 0°.

* * * * *